US010801886B2

(12) United States Patent
Mandai et al.

(10) Patent No.: US 10,801,886 B2
(45) Date of Patent: Oct. 13, 2020

(54) SPAD DETECTOR HAVING MODULATED SENSITIVITY

(71) Applicant: Apple Inc., Cupertino, CA (US)

(72) Inventors: Shingo Mandai, Mountain View, CA (US); Andrew Kenneth John McMahon, San Carlos, CA (US); Cristiano L. Niclass, San Jose, CA (US); Thierry Oggier, San Jose, CA (US); Tal Kaitz, Kiryat Ono (IL); Moshe Laifenfeld, Haifa (IL)

(73) Assignee: Apple Inc., Cupertino, CA (US)

( * ) Notice: Subject to any disclaimer, the term of this patent is extended or adjusted under 35 U.S.C. 154(b) by 199 days.

(21) Appl. No.: 15/879,365

(22) Filed: Jan. 24, 2018

(65) Prior Publication Data

US 2018/0209846 A1 Jul. 26, 2018

Related U.S. Application Data

(60) Provisional application No. 62/450,499, filed on Jan. 25, 2017.

(51) Int. Cl.
| *G01J 1/44* | (2006.01) |
| *G01S 7/48* | (2006.01) |
| *G01J 1/42* | (2006.01) |
| *G01S 7/486* | (2020.01) |
| *G01S 7/4863* | (2020.01) |
| *G01S 7/4865* | (2020.01) |

(Continued)

(52) U.S. Cl.
CPC ............. *G01J 1/44* (2013.01); *G01J 1/4228* (2013.01); *G01S 7/4863* (2013.01); *G01S 7/4865* (2013.01); *G01S 7/4868* (2013.01);

*G01S 17/08* (2013.01); *G01S 17/89* (2013.01); *G01J 2001/442* (2013.01); *G01J 2001/4466* (2013.01)

(58) Field of Classification Search
CPC .... G01J 1/44; G01J 1/4228; G01J 2001/4466; G01J 2001/442; G01S 7/4868; G01S 7/4863; G01S 7/4865; G01S 17/89; G01S 17/08
USPC .............................................. 250/207, 208.1
See application file for complete search history.

(56) References Cited

U.S. PATENT DOCUMENTS

| 4,686,572 A | 8/1987 | Takatsu |
| 4,686,648 A | 8/1987 | Fossum |

(Continued)

FOREIGN PATENT DOCUMENTS

| CN | 1630350 | 6/2005 |
| CN | 1774032 | 5/2006 |

(Continued)

OTHER PUBLICATIONS

U.S. Appl. No. 15/627,409, filed Jun. 19, 2017, Agranov et al.

(Continued)

*Primary Examiner* — Seung C Sohn
(74) *Attorney, Agent, or Firm* — Brownstein Hyatt Farber Schreck, LLP

(57) ABSTRACT

The sensitivity of one or more single-photon avalanche diodes (SPAD) in a SPAD detector is modulated over time. The sensitivity of all of the SPADs may be modulated, or the sensitivity of one section of the SPADs can be modulated differently from another section of the SPADs. Various techniques for modulating the sensitivity are disclosed.

23 Claims, 22 Drawing Sheets

(51) Int. Cl.
*G01S 17/89* (2020.01)
*G01S 17/08* (2006.01)

(56) References Cited

U.S. PATENT DOCUMENTS

| | | |
|---|---|---|
| 5,105,264 A | 4/1992 | Erhardt et al. |
| 5,329,313 A | 7/1994 | Keith |
| 5,396,893 A | 3/1995 | Oberg et al. |
| 5,471,515 A | 11/1995 | Fossum et al. |
| 5,541,402 A | 7/1996 | Ackland |
| 5,550,677 A | 8/1996 | Schofield et al. |
| 5,781,312 A | 7/1998 | Noda |
| 5,841,126 A | 11/1998 | Fossum et al. |
| 5,880,459 A | 3/1999 | Pryor et al. |
| 5,949,483 A | 9/1999 | Fossum et al. |
| 6,008,486 A | 12/1999 | Stam et al. |
| 6,040,568 A | 3/2000 | Caulfield et al. |
| 6,233,013 B1 | 5/2001 | Hosier et al. |
| 6,348,929 B1 | 2/2002 | Acharya et al. |
| 6,448,550 B1 | 9/2002 | Nishimura |
| 6,528,833 B2 | 3/2003 | Lee et al. |
| 6,541,751 B1 | 4/2003 | Bidermann |
| 6,670,904 B1 | 12/2003 | Yakovlev |
| 6,713,796 B1 | 3/2004 | Fox |
| 6,714,239 B2 | 3/2004 | Guidash |
| 6,798,453 B1 | 9/2004 | Kaifu |
| 6,816,676 B2 | 11/2004 | Bianchi et al. |
| 6,905,470 B2 | 6/2005 | Lee et al. |
| 6,931,269 B2 | 8/2005 | Terry |
| 6,956,605 B1 | 10/2005 | Hashimoto |
| 6,982,759 B2 | 1/2006 | Goto |
| 7,075,049 B2 | 7/2006 | Rhodes et al. |
| 7,084,914 B2 | 8/2006 | Van Blerkom |
| 7,091,466 B2 | 8/2006 | Bock |
| 7,119,322 B2 | 10/2006 | Hong |
| 7,133,073 B1 | 11/2006 | Neter |
| 7,259,413 B2 | 8/2007 | Rhodes |
| 7,262,401 B2 | 8/2007 | Hopper et al. |
| 7,271,835 B2 | 9/2007 | Iizuka |
| 7,282,028 B2 | 10/2007 | Kim et al. |
| 7,319,218 B2 | 1/2008 | Krymski |
| 7,332,786 B2 | 2/2008 | Altice |
| 7,390,687 B2 | 6/2008 | Boettiger |
| 7,415,096 B2 | 8/2008 | Sherman |
| 7,437,013 B2 | 10/2008 | Anderson |
| 7,443,421 B2 | 10/2008 | Stavely et al. |
| 7,446,812 B2 | 11/2008 | Ando et al. |
| 7,453,131 B2 | 11/2008 | Marshall et al. |
| 7,471,315 B2 | 12/2008 | Silsby et al. |
| 7,502,054 B2 | 3/2009 | Kalapathy |
| 7,525,168 B2 | 4/2009 | Hsieh |
| 7,554,067 B2 | 6/2009 | Zarnoski et al. |
| 7,555,158 B2 | 6/2009 | Park et al. |
| 7,589,316 B2 | 9/2009 | Dunki-Jacobs |
| 7,622,699 B2 | 11/2009 | Sakakibara et al. |
| 7,626,626 B2 | 12/2009 | Panicacci |
| 7,636,109 B2 | 12/2009 | Nakajima et al. |
| 7,667,400 B1 | 2/2010 | Goushcha |
| 7,671,435 B2 | 3/2010 | Ahn |
| 7,696,483 B2 * | 4/2010 | Tkaczyk .............. G01T 1/171 250/370.06 |
| 7,714,292 B2 | 5/2010 | Agarwal et al. |
| 7,728,351 B2 | 6/2010 | Shim |
| 7,733,402 B2 | 6/2010 | Egawa et al. |
| 7,742,090 B2 | 6/2010 | Street |
| 7,764,312 B2 | 7/2010 | Ono et al. |
| 7,773,138 B2 | 8/2010 | Lahav et al. |
| 7,786,543 B2 | 8/2010 | Hsieh |
| 7,796,171 B2 | 9/2010 | Gardner |
| 7,817,198 B2 | 10/2010 | Kang et al. |
| 7,838,956 B2 | 11/2010 | McCarten et al. |
| 7,873,236 B2 | 1/2011 | Li et al. |
| 7,880,785 B2 | 2/2011 | Gallagher |
| 7,884,402 B2 | 2/2011 | Ki |
| 7,906,826 B2 | 3/2011 | Martin et al. |
| 7,952,121 B2 | 5/2011 | Arimoto |
| 7,952,635 B2 | 5/2011 | Lauxtermann |
| 7,982,789 B2 | 7/2011 | Watanabe et al. |
| 8,026,966 B2 | 9/2011 | Altice |
| 8,032,206 B1 | 10/2011 | Farazi et al. |
| 8,089,036 B2 | 1/2012 | Manabe et al. |
| 8,089,524 B2 | 1/2012 | Urisaka |
| 8,094,232 B2 | 1/2012 | Kusaka |
| 8,116,540 B2 | 2/2012 | Dean |
| 8,140,143 B2 | 3/2012 | Picard et al. |
| 8,153,947 B2 | 4/2012 | Barbier et al. |
| 8,159,570 B2 | 4/2012 | Negishi |
| 8,159,588 B2 | 4/2012 | Boemler |
| 8,164,669 B2 | 4/2012 | Compton et al. |
| 8,174,595 B2 | 5/2012 | Honda et al. |
| 8,184,188 B2 | 5/2012 | Yaghmai |
| 8,194,148 B2 | 6/2012 | Doida |
| 8,194,165 B2 | 6/2012 | Border et al. |
| 8,222,586 B2 | 7/2012 | Lee |
| 8,227,844 B2 | 7/2012 | Adkisson |
| 8,233,071 B2 | 7/2012 | Takeda |
| 8,259,228 B2 | 9/2012 | Wei et al. |
| 8,310,577 B1 | 11/2012 | Neter |
| 8,324,553 B2 | 12/2012 | Lee |
| 8,338,856 B2 | 12/2012 | Tai et al. |
| 8,340,407 B2 | 12/2012 | Kalman |
| 8,350,940 B2 | 1/2013 | Smith et al. |
| 8,355,117 B2 | 1/2013 | Niclass |
| 8,388,346 B2 | 3/2013 | Rantala et al. |
| 8,400,546 B2 | 3/2013 | Itano et al. |
| 8,456,540 B2 | 6/2013 | Egawa |
| 8,456,559 B2 | 6/2013 | Yamashita |
| 8,508,637 B2 | 8/2013 | Han et al. |
| 8,514,308 B2 | 8/2013 | Itonaga et al. |
| 8,520,913 B2 | 8/2013 | Dean |
| 8,546,737 B2 | 10/2013 | Tian et al. |
| 8,547,388 B2 | 10/2013 | Cheng |
| 8,575,531 B2 | 11/2013 | Hynecek et al. |
| 8,581,992 B2 | 11/2013 | Hamada |
| 8,594,170 B2 | 11/2013 | Mombers et al. |
| 8,619,163 B2 | 12/2013 | Ogua |
| 8,619,170 B2 | 12/2013 | Mabuchi |
| 8,629,484 B2 | 1/2014 | Ohri et al. |
| 8,634,002 B2 | 1/2014 | Kita |
| 8,637,875 B2 | 1/2014 | Finkelstein et al. |
| 8,648,947 B2 | 2/2014 | Sato et al. |
| 8,653,434 B2 | 2/2014 | Johnson et al. |
| 8,723,975 B2 | 5/2014 | Solhusvik |
| 8,724,096 B2 | 5/2014 | Gosch et al. |
| 8,730,345 B2 | 5/2014 | Watanabe |
| 8,754,983 B2 | 6/2014 | Sutton |
| 8,755,854 B2 | 6/2014 | Addison et al. |
| 8,759,736 B2 | 6/2014 | Yoo |
| 8,760,413 B2 | 6/2014 | Peterson et al. |
| 8,767,104 B2 | 7/2014 | Makino et al. |
| 8,803,990 B2 | 8/2014 | Smith |
| 8,810,703 B2 | 8/2014 | Mabuchi |
| 8,817,154 B2 | 8/2014 | Manabe et al. |
| 8,874,377 B1 * | 10/2014 | Sickenberger ............ G01J 1/58 250/458.1 |
| 8,879,686 B2 | 11/2014 | Okada et al. |
| 8,902,330 B2 | 12/2014 | Theuwissen |
| 8,902,341 B2 | 12/2014 | Machida |
| 8,908,073 B2 | 12/2014 | Minagawa |
| 8,923,994 B2 | 12/2014 | Laikari et al. |
| 8,934,030 B2 | 1/2015 | Kim et al. |
| 8,936,552 B2 | 1/2015 | Kateraas et al. |
| 8,946,610 B2 | 2/2015 | Iwabuchi et al. |
| 8,982,237 B2 | 3/2015 | Chen |
| 9,006,641 B2 | 4/2015 | Drader |
| 9,041,837 B2 | 5/2015 | Li |
| 9,017,748 B2 | 6/2015 | Theuwissen |
| 9,054,009 B2 | 6/2015 | Oike et al. |
| 9,058,081 B2 | 6/2015 | Baxter |
| 9,066,017 B2 | 6/2015 | Geiss |
| 9,066,660 B2 | 6/2015 | Watson et al. |
| 9,088,727 B2 | 7/2015 | Trumbo |
| 9,094,623 B2 | 7/2015 | Kawaguchi |
| 9,099,604 B2 | 8/2015 | Roy |

(56) References Cited

U.S. PATENT DOCUMENTS

| | | |
|---|---|---|
| 9,100,597 B2 | 8/2015 | Hu |
| 9,106,859 B2 | 8/2015 | Kizuna et al. |
| 9,131,171 B2 | 9/2015 | Aoki et al. |
| 9,151,829 B2 | 10/2015 | Campbell |
| 9,154,750 B2 | 10/2015 | Pang |
| 9,160,949 B2 | 10/2015 | Zhang et al. |
| 9,164,144 B2 | 10/2015 | Dolinsky |
| 9,176,241 B2 * | 11/2015 | Frach ............... H04N 5/369 |
| 9,178,100 B2 | 11/2015 | Webster et al. |
| 9,209,320 B1 | 12/2015 | Webster |
| 9,225,948 B2 | 12/2015 | Hasegawa |
| 9,232,150 B2 | 1/2016 | Kleekajai et al. |
| 9,232,161 B2 | 1/2016 | Suh |
| 9,235,267 B2 | 1/2016 | Burrough et al. |
| 9,270,906 B2 | 2/2016 | Peng et al. |
| 9,276,031 B2 | 3/2016 | Wan |
| 9,277,144 B2 | 3/2016 | Kleekajai et al. |
| 9,287,304 B2 | 3/2016 | Park et al. |
| 9,288,380 B2 | 3/2016 | Nomura |
| 9,288,404 B2 | 3/2016 | Papiashvili |
| 9,293,500 B2 | 3/2016 | Sharma et al. |
| 9,312,401 B2 | 4/2016 | Webster |
| 9,313,434 B2 | 4/2016 | Dutton et al. |
| 9,319,611 B2 | 4/2016 | Fan |
| 9,331,116 B2 | 5/2016 | Webster |
| 9,344,649 B2 | 5/2016 | Bock |
| 9,354,332 B2 | 5/2016 | Zwaans |
| 9,380,245 B1 | 6/2016 | Guidash |
| 9,392,237 B2 | 7/2016 | Toyoda |
| 9,417,326 B2 | 8/2016 | Niclass et al. |
| 9,438,258 B1 | 9/2016 | Yoo |
| 9,445,018 B2 | 9/2016 | Fettig et al. |
| 9,448,110 B2 | 9/2016 | Wong |
| 9,451,887 B2 | 9/2016 | Watson et al. |
| 9,467,553 B2 | 10/2016 | Heo et al. |
| 9,473,706 B2 | 10/2016 | Malone et al. |
| 9,478,030 B1 | 10/2016 | Lecky |
| 9,479,688 B2 | 10/2016 | Ishii |
| 9,490,285 B2 | 11/2016 | Itonaga |
| 9,497,397 B1 | 11/2016 | Kleekajai et al. |
| 9,503,616 B2 | 11/2016 | Taniguchi et al. |
| 9,516,244 B2 | 12/2016 | Borowski |
| 9,538,106 B2 | 1/2017 | McMahon et al. |
| 9,549,099 B2 | 1/2017 | Fan |
| 9,560,339 B2 | 1/2017 | Borowski |
| 9,584,743 B1 | 2/2017 | Lin et al. |
| 9,596,420 B2 | 3/2017 | Fan et al. |
| 9,596,423 B1 | 3/2017 | Molgaard |
| 9,639,063 B2 | 5/2017 | Dutton et al. |
| 9,661,308 B1 | 5/2017 | Wang et al. |
| 9,685,576 B2 | 6/2017 | Webster |
| 9,686,485 B2 | 6/2017 | Agranov et al. |
| 9,700,240 B2 | 7/2017 | Letchner et al. |
| 9,741,754 B2 | 8/2017 | Li et al. |
| 9,749,556 B2 | 8/2017 | Fettig et al. |
| 9,774,318 B2 | 9/2017 | Song |
| 9,781,368 B2 | 10/2017 | Song |
| 9,831,283 B2 | 11/2017 | Shepard et al. |
| 9,857,469 B2 | 1/2018 | Oggier et al. |
| 9,870,053 B2 | 1/2018 | Modarres et al. |
| 9,888,198 B2 | 2/2018 | Mauritzson et al. |
| 9,894,304 B1 | 2/2018 | Smith |
| 9,912,883 B1 | 3/2018 | Agranov et al. |
| 9,935,231 B2 | 4/2018 | Roehrer |
| 9,939,316 B2 * | 4/2018 | Scott .................. G01S 7/4863 |
| 9,952,323 B2 | 4/2018 | Deane |
| 9,985,163 B2 * | 5/2018 | Moore ................ H01L 31/107 |
| 10,026,772 B2 | 7/2018 | Shinohara |
| 10,136,090 B2 | 11/2018 | Vogelsang et al. |
| 10,153,310 B2 | 12/2018 | Zhang et al. |
| 10,217,889 B2 | 2/2019 | Dhulla et al. |
| 10,267,901 B2 | 4/2019 | Drader |
| 10,285,626 B1 | 5/2019 | Kestelli et al. |
| 10,495,736 B2 * | 12/2019 | Zhuang ................ G01S 17/89 |
| 2003/0036685 A1 | 2/2003 | Goodman et al. |
| 2004/0207836 A1 | 10/2004 | Chhibber et al. |
| 2005/0026332 A1 | 2/2005 | Fratti et al. |
| 2006/0274161 A1 | 12/2006 | Ing et al. |
| 2007/0263099 A1 | 11/2007 | Motta et al. |
| 2008/0177162 A1 | 7/2008 | Bae et al. |
| 2008/0315198 A1 | 12/2008 | Jung |
| 2009/0096901 A1 | 4/2009 | Bae et al. |
| 2009/0101914 A1 | 4/2009 | Hirotsu et al. |
| 2009/0146234 A1 | 6/2009 | Luo et al. |
| 2009/0201400 A1 | 8/2009 | Zhang et al. |
| 2009/0219266 A1 | 9/2009 | Lim et al. |
| 2010/0110018 A1 | 5/2010 | Faubert et al. |
| 2010/0134631 A1 | 6/2010 | Voth |
| 2010/0159632 A1 | 6/2010 | Rhodes et al. |
| 2011/0080500 A1 | 4/2011 | Wang et al. |
| 2011/0156197 A1 | 6/2011 | Tivarus et al. |
| 2011/0164162 A1 | 7/2011 | Kato |
| 2012/0092541 A1 | 4/2012 | Tuulos et al. |
| 2012/0127088 A1 | 5/2012 | Pance et al. |
| 2012/0162632 A1 | 6/2012 | Dutton |
| 2013/0147981 A1 | 6/2013 | Wu |
| 2014/0049683 A1 | 2/2014 | Guenter |
| 2014/0071321 A1 | 3/2014 | Seyama |
| 2014/0132528 A1 | 5/2014 | Catton |
| 2014/0231630 A1 | 8/2014 | Rae et al. |
| 2015/0062391 A1 | 3/2015 | Murata |
| 2015/0277559 A1 | 10/2015 | Vescovi et al. |
| 2015/0312479 A1 | 10/2015 | McMahon et al. |
| 2016/0050379 A1 | 2/2016 | Jiang et al. |
| 2016/0205311 A1 | 7/2016 | Mandelli et al. |
| 2016/0218236 A1 | 7/2016 | Dhulla et al. |
| 2016/0219232 A1 | 7/2016 | Murata |
| 2016/0274237 A1 | 9/2016 | Stutz |
| 2016/0307325 A1 | 10/2016 | Wang et al. |
| 2016/0356890 A1 | 12/2016 | Fried et al. |
| 2016/0365380 A1 | 12/2016 | Wan |
| 2017/0047363 A1 | 2/2017 | Choi et al. |
| 2017/0052065 A1 | 2/2017 | Sharma et al. |
| 2017/0082746 A1 | 3/2017 | Kubota et al. |
| 2017/0084133 A1 | 3/2017 | Cardinali et al. |
| 2017/0142325 A1 | 5/2017 | Shimokawa et al. |
| 2017/0223292 A1 | 8/2017 | Ikeda |
| 2017/0272675 A1 | 9/2017 | Kobayashi |
| 2017/0364736 A1 | 12/2017 | Ollila |
| 2017/0373106 A1 | 12/2017 | Li et al. |
| 2018/0090526 A1 | 3/2018 | Mandai et al. |
| 2018/0090536 A1 | 3/2018 | Mandai et al. |
| 2018/0109742 A1 | 4/2018 | Agranov et al. |
| 2018/0213205 A1 | 7/2018 | Oh |
| 2019/0018119 A1 | 1/2019 | Laifenfeld et al. |
| 2019/0027674 A1 | 1/2019 | Zhang et al. |
| 2019/0198701 A1 | 6/2019 | Moussy |

FOREIGN PATENT DOCUMENTS

| | | |
|---|---|---|
| CN | 1833429 | 9/2006 |
| CN | 1842138 | 10/2006 |
| CN | 1947414 | 4/2007 |
| CN | 101189885 | 5/2008 |
| CN | 101221965 | 7/2008 |
| CN | 101233763 | 7/2008 |
| CN | 101472059 | 7/2009 |
| CN | 101567977 | 10/2009 |
| CN | 101622859 | 1/2010 |
| CN | 101739955 | 6/2010 |
| CN | 101754029 | 6/2010 |
| CN | 101803925 | 8/2010 |
| CN | 102036020 | 4/2011 |
| CN | 102067584 | 5/2011 |
| CN | 102208423 | 10/2011 |
| CN | 102451160 | 5/2012 |
| CN | 102668542 | 9/2012 |
| CN | 102820309 | 12/2012 |
| CN | 102821255 | 12/2012 |
| CN | 103024297 | 4/2013 |
| CN | 103051843 | 4/2013 |
| CN | 103299437 | 9/2013 |
| CN | 103329513 | 9/2013 |
| CN | 103546702 | 1/2014 |

(56) References Cited

FOREIGN PATENT DOCUMENTS

| | | |
|---|---|---|
| CN | 103779437 | 5/2014 |
| CN | 104103655 | 10/2014 |
| CN | 104779259 | 7/2015 |
| CN | 104810377 | 7/2015 |
| CN | 204761615 | 11/2015 |
| CN | 105185796 | 12/2015 |
| DE | 102010060527 | 4/2012 |
| EP | 1763228 | 3/2007 |
| EP | 2023611 | 2/2009 |
| EP | 2107610 | 10/2009 |
| EP | 2230690 | 9/2010 |
| EP | 2512126 | 10/2012 |
| EP | 2787531 | 10/2014 |
| JP | S61123287 | 6/1986 |
| JP | 2007504670 | 8/1987 |
| JP | 2000059697 | 2/2000 |
| JP | 2001211455 | 8/2001 |
| JP | 2001358994 | 12/2001 |
| JP | 2004111590 | 4/2004 |
| JP | 2005318504 | 11/2005 |
| JP | 2006287361 | 10/2006 |
| JP | 2007516654 | 6/2007 |
| JP | 2008507908 | 3/2008 |
| JP | 2008271280 | 11/2008 |
| JP | 2008543061 | 11/2008 |
| JP | 2009021809 | 1/2009 |
| JP | 2009159186 | 7/2009 |
| JP | 2009212909 | 9/2009 |
| JP | 2009296465 | 12/2009 |
| JP | 2010080604 | 4/2010 |
| JP | 2010114834 | 5/2010 |
| JP | 2011040926 | 2/2011 |
| JP | 2011049697 | 3/2011 |
| JP | 2011091775 | 5/2011 |
| JP | 11-216970 | 10/2011 |
| JP | 11-217315 | 10/2011 |
| JP | 2011097646 | 12/2011 |
| JP | 2012010306 | 1/2012 |
| JP | 2012019516 | 1/2012 |
| JP | 2012038981 | 2/2012 |
| JP | 2012513160 | 6/2012 |
| JP | 2012169530 | 9/2012 |
| JP | 2013051523 | 3/2013 |
| JP | 2013070240 | 4/2013 |
| JP | 2013529035 | 7/2013 |
| JP | 2014081254 | 5/2014 |
| JP | 2014225647 | 12/2014 |
| JP | 2015041746 | 3/2015 |
| JP | 2016145776 | 8/2016 |
| KR | 20030034424 | 5/2003 |
| KR | 20030061157 | 7/2003 |
| KR | 20050103732 | 11/2005 |
| KR | 2008/0069851 | 7/2008 |
| KR | 20100008239 | 1/2010 |
| KR | 20100065084 | 6/2010 |
| KR | 20130074459 | 7/2013 |
| TW | 200520551 | 6/2005 |
| TW | 200803481 | 1/2008 |
| TW | 201110689 | 3/2011 |
| TW | 201301881 | 1/2013 |
| WO | WO 05/041304 | 5/2005 |
| WO | WO 06/014641 | 2/2006 |
| WO | WO 06/130443 | 12/2006 |
| WO | WO 07/049900 | 5/2007 |
| WO | WO 10/120945 | 10/2010 |
| WO | WO 12/011095 | 1/2012 |
| WO | WO 12/032353 | 3/2012 |
| WO | WO 12/053363 | 4/2012 |
| WO | WO 12/088338 | 6/2012 |
| WO | WO 12/122572 | 9/2012 |
| WO | WO 12/138687 | 10/2012 |
| WO | WO 13/008425 | 1/2013 |
| WO | WO 13/179018 | 12/2013 |
| WO | WO 13/179020 | 12/2013 |
| WO | WO 17/112416 | 6/2017 |

OTHER PUBLICATIONS

U.S. Appl. No. 15/653,468, filed Jul. 18, 2017, Zhang et al.
U.S. Appl. No. 15/699,806, filed Sep. 8, 2017, Li et al.
U.S. Appl. No. 15/713,477, filed Sep. 22, 2017, Mandai et al.
U.S. Appl. No. 15/713,520, filed Sep. 22, 2017, Mandai et al.
U.S. Appl. No. 15/879,350, filed Jan. 24, 2018, Mandai et al.
U.S. Appl. No. 15/880,285, filed Jan. 25, 2018, Laifenfeld et al.
U.S. Appl. No. 16/226,491, filed Dec. 19, 2018, McMahon.
Aoki, et al., "Rolling-Shutter Distortion-Free 3D Stacked Image Sensor with -160dB Parasitic Light Sensitivity In-Pixel Storage Node," ISSCC 2013, Session 27, Image Sensors, 27.3 27.3 A, Feb. 20, 2013, retrieved on Apr. 11, 2014 from URL:http://ieeexplore.ieee.org/stamp/stamp.jsp?tp=&arnumber=6487824.
Charbon, et al., SPAD-Based Sensors, *TOF Range-Imaging Cameras*, F. Remondino and D. Stoppa (eds.), 2013, Springer-Verlag Berlin Heidelberg, pp. 11-38.
Cox, "Getting histograms with varying bin widths," http://www.stata.com/support/faqs/graphics/histograms-with-varying-bin-widths/, Nov. 13, 2017, 5 pages.
Elgendi, "On the Analysis of Fingertip Photoplethysmogram Signals," *Current Cardiology Reviews*, 2012, vol. 8, pp. 14-25.
Feng, et al., "On the Stoney Formula for a Thin Film/Substrate System with Nonuniform Substrate Thickness," *Journal of Applied Mechanics*, Transactions of the ASME, vol. 74, Nov. 2007, pp. 1276-1281.
Fu, et al., "Heart Rate Extraction from Photoplethysmogram Waveform Using Wavelet Multui-resolution Analysis," *Journal of Medical and Biological Engineering*, 2008, vol. 28, No. 4, pp. 229-232.
Gallivanoni, et al., "Progress n Quenching Circuits for Single Photon Avalanche Diodes," *IEEE Transactions on Nuclear Science*, vol. 57, No. 6, Dec. 2010, pp. 3815-3826.
Han, et al., "Artifacts in wearable photoplethysmographs during daily life motions and their reduction with least mean square based active noise cancellation method," *Computers in Biology and Medicine*, 2012, vol. 42, pp. 387-393.
Leslar, et al., "Comprehensive Utilization of Temporal and Spatial Domain Outlier Detection Methods for Mobile Terrestrial LiDAR Data," *Remote Sensing*, 2011, vol. 3, pp. 1724-1742.
Lopez-Silva, et al., "Heuristic Algorithm for Photoplethysmographic Heart Rate Tracking During Maximal Exercise Test," *Journal of Medical and Biological Engineering*, 2011, vol. 12, No. 3, pp. 181-188.
Mota, et al., "A flexible multi-channel high-resolution Time-to-Digital Converter ASIC," *Nuclear Science Symposium Conference Record IEEE*, 2000, Engineering School of Geneva, Microelectronics Lab, Geneva, Switzerland, 8 pages.
Niclass, et al., "Design and Characterization of a CMOS 3-D Image Sensor Based on Single Photon Avalanche Diodes," *IEEE Journal of Solid-State Circuits*, vol. 40, No. 9, Sep. 2005, pp. 1847-1854.
Santos, et al., "Accelerometer-assisted PPG Measurement During Physical Exercise Using the LAVIMO Sensor System," *Acta Polytechnica*, 2012, vol. 52, No. 5, pp. 80-85.
Sarkar, et al., "Fingertip Pulse Wave (PPG signal) Analysis and Heart Rate Detection," *International Journal of Emerging Technology and Advanced Engineering*, 2012, vol. 2, No. 9, pp. 404-407.
Schwarzer, et al., On the determination of film stress from substrate bending: Stoney's formula and its limits, Jan. 2006, 19 pages.
Shen et al., "Stresses, Curvatures, and Shape Changes Arising from Patterned Lines on Silicon Wafers," Journal of Applied Physics, vol. 80, No. 3, Aug. 1996, pp. 1388-1398.
Shin, et al., "Photon-Efficient Computational 3D and Reflectivity Imaging with Single-Photon Detectors," IEEE International Conference on Image Processing, Paris, France, Oct. 2014, 11 pages.
Tisa, et al., "Variable-Load Quenching Circuit for single-photon avalanche diodes," Optics Express, vol. 16, No. 3, Feb. 4, 2008, pp. 2232-2244.
Ullrich, et al., "Linear LIDAR versus Geiger-mode LIDAR: Impact on data properties and data quality," *Laser Radar Technology and Applications XXI*, edited by Monte D. Turner, Gary W. Kamerman, Proc. of SPIE, vol. 9832, 983204, 2016, 17 pages.

(56) References Cited

OTHER PUBLICATIONS

Yan, et al., "Reduction of motion artifact in pulse oximetry by smoothed pseudo Wigner-Ville distribution," *Journal of NeuroEngineering and Rehabilitation*, 2005, vol. 2, No. 3, pp. 1-9.

Yousefi, et al., "Adaptive Cancellation of Motion Artifact in Wearable Biosensors," 34th Annual International Conference of the IEEE EMBS, San Diego, California, Aug./Sep. 2012, pp. 2004-2008.

Invitation to Pay Additional Fees dated Apr. 30, 2018, PCT/US2018/015082, 15 pages.

International Search Report and Written Opinion dated Jul. 24, 2018, PCT/US2018/015082, 22 pages.

Jahromi et al., "A Single Chip Laser Radar Receiver with a 9x9 SPAD Detector Array and a 10-channel TDC," 2013 Proceedings of the ESSCIRC, IEEE, Sep. 14, 2015, pp. 364-367.

\* cited by examiner

SPAD DETECTOR HAVING MODULATED SENSITIVITY

CROSS-REFERENCE TO RELATED APPLICATIONS

This application claims the benefit under 35 U.S.C. § 119(e) of U.S. Provisional Patent Application No. 62/450,499, filed on Jan. 25, 2017, and entitled "SPAD Detector Having Modulated Sensitivity," which is incorporated by reference as if fully disclosed herein.

FIELD

The described embodiments relate generally to SPAD detectors, i.e., light detectors using single-photon avalanche diodes (SPADs). More particularly, the present embodiments relate to various techniques for modulating the sensitivity of a SPAD detector.

BACKGROUND

SPAD detectors are utilized in a variety of applications, such as low-light detection applications, time-of-flight (TOF) applications, and time-correlated single photon counting applications. A SPAD detector typically includes an array of SPAD pixels, with each SPAD pixel including a SPAD and related biasing and/or read out circuitry. Each SPAD includes a photosensitive region that is configured to detect low levels of light (down to a single photon) and generate a corresponding output signal. When a photon impinging on a SPAD of a SPAD pixel is part of a reflection from an object of an emitted light pulse, the output signal can be used to estimate the arrival time of the photon at the SPAD after emission of the light pulse. Multiple such arrival times can be used to estimate a distance to the object.

A SPAD typically has a constant sensitivity to photons, regardless of the distance between the SPAD d and an object from which a photon has been reflected. In situations in which the object is close to the SPAD detector, the photons in the light reflected from that object impinge on the SPADs of the SPAD detector sooner and often in higher numbers than in situations in which the object is farther from the SPAD detector. Additionally, the photons in light reflected from an object having a higher reflectivity may impinge on the SPADs in higher numbers than photons in light reflected from an object having a lower reflectivity. When one or more photons impinge on a SPAD, the photons may trigger an avalanche event. A triggered SPAD (i.e., a SPAD in which an avalanche event has been triggered) will produce an output pulse signal corresponding to the SPAD's trigger time. Following an avalanche event or trigger, a SPAD will be saturated and have a recharging "dead time" during which the SPAD cannot be used to detect photons. Emitted photons reflected from a closer or more reflective object can saturate a SPAD at an early time and cause the SPAD to be unusable for detecting photons reflected from objects within a desired detection range. This can result in incorrect or unavailable estimates of the distance to an object within an intended detection range.

To compensate for SPAD saturation, the photon detection efficiency of the SPAD detector can be lowered by reducing the sensitivity of the SPADs in the pixel array. However, reducing the sensitivity reduces the signal-to-noise ratio of the signals produced by the SPADs.

SUMMARY

Embodiments described herein modulate the sensitivity of a single-photon avalanche diode (SPAD) detector over time.

In one aspect, a SPAD detector has an array of SPAD pixels that includes a reference sub-array and an imaging sub-array. A method for operating the pixel array includes detecting a time to enable an operation of an imaging SPAD in the imaging sub-array using a reference SPAD in the reference sub-array, and in response to detecting the time, enabling the operation of the imaging SPAD such that the imaging SPAD detects photons. A non-uniform histogram is then constructed based on a time of flight of each detected photon. The non-uniform histogram includes a first bin that represents a first span of time, and a second bin that represents a different second span of time. The first bin provides the SPAD detector with a first sensitivity to photons and the second bin a second sensitivity to photons that is different from the first sensitivity.

In another aspect, a SPAD detector includes a pixel array that has multiple lines of pixels. In one embodiment, each line of pixels is a column of pixels. A time-to-digital (TDC) array circuit is operably connected to the pixel array. The TDC array circuit includes an array of TDC circuits with a subset of the TDC circuits operably connected to each respective line of pixels. A memory is operably connected to the TDC array circuit. The memory is configured to store a non-uniform histogram. The non-uniform histogram includes a first bin that represents a first span of time, and a second bin that represents a different second span of time. The first bin provides the SPAD detector with a first sensitivity to photons and the second bin a second sensitivity to photons that is different from the first sensitivity.

In another aspect, a pixel includes a SPAD operably connected between a node and a first voltage supply; a gating transistor operably connected between the node and a reference voltage supply; and a quenching transistor operably connected between the node and a second voltage supply. The gating transistor is configured to receive a gating signal that enables an operation of the SPAD and disables an operation of the SPAD. In some embodiments, a gate of the quenching transistor is connectable to a first switch and to a second switch. The first switch is connected to a first quenching signal, and the second switch is connected to a second quenching signal that is different from the first quenching signal.

In yet another aspect, a SPAD detector includes a pixel array comprising a plurality of pixels arranged in a reference sub-array and an imaging sub-array. Each pixel in the pixel array includes a SPAD and a quenching transistor operably connected to the SPAD. A constant voltage source is operably connected to a terminal of each quenching transistor in the pixels in the reference sub-array. A switch array is operably connected to the pixel array, and each switch in the switch array is connected to a respective line of pixels in the imaging sub-array. In one embodiment, each line of pixels is a column of pixels in the pixel array. A variable voltage source is operably connected to a terminal of each quenching transistor in the pixels in each line of pixels in the imaging sub-array through a respective switch in the switch array.

In another aspect, a SPAD detector includes pixel array comprising a plurality of pixels and a switch array operably connected to the pixel array. Each pixel in the pixel array includes a SPAD and a quenching transistor operably connected to the SPAD. A variable signal generator or source is operably connected to a terminal of each quenching transistor in each line of pixels in the pixel array through a respective switch in the switch array. The variable signal generator or source may provide a variable voltage input signal, a variable current signal, or other input signal to the quenching transistors. In one embodiment, a global current source is operably connected to a gate of each quenching transistor in each line of pixels in the pixel array through a respective switch in the switch array. In another embodiment, a plurality of current sources is operably connected to the pixel array. A gate of each quenching transistor in each line of pixels is operably connected to a respective current source through a respective switch in the switch array.

BRIEF DESCRIPTION OF THE DRAWINGS

The disclosure will be readily understood by the following detailed description in conjunction with the accompanying drawings, wherein like reference numerals designate like structural elements, and in which.

Figure 1:
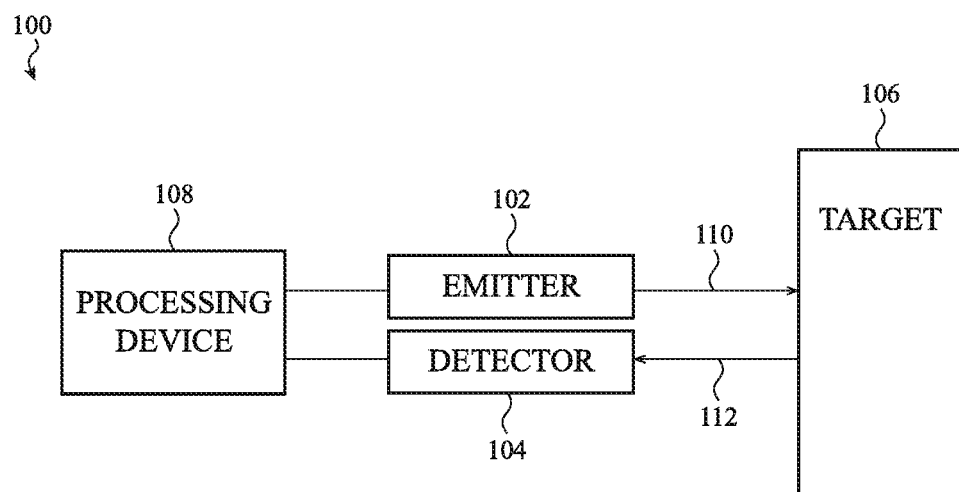
FIG. 1 shows one example of a system that includes one or more SPAD detectors.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a SPAD detector, i.e., a light detector that uses single-photon avalanche diodes (SPADs). The SPAD detector includes an array of SPAD pixels. Each SPAD pixel (hereinafter just "pixel") includes a SPAD. Each pixel may also include associated biasing and/or control circuit elements, such as one or more of a quenching transistor operably connected to the SPAD, and a gating transistor operably connected to the SPAD. Further circuit elements are described below for various embodiments.

A SPAD detector can be used as part of an imaging or ranging system for determining distances to objects in a field of view (FOV). In many such distance determinations, a sequence of light pulses is emitted from a light source or sources into the FOV. The light source(s) may include, for example, one or more lasers. The light source(s) may either be a component of the SPAD detector, or operatively linked with the SPAD detector. The emitted light pulses typically have a brief duration after which there is a longer time period in which the light source is off, and the SPAD detector is used to detect reflections of the emitted light pulses from objects in the FOV. The time period between initiation of the emitted light pulses is the pulse repetition interval (PRI). By determining the time of flight (TOF) between emission of a light pulse and detection of reflected photons, the distance to the object can be determined.

There are various issues that arise when using a SPAD detector to make distance determinations. It may be that any particular pixel in the imaging array will only detect one or a few reflected photons of each reflected pulse. Further, a particular SPAD in a pixel may receive a photon from ambient light and produce an output signal at a time unrelated to the distance to the object. Also, as described previously, a photon in a reflected light pulse can be detected by the SPAD at any time during which the reflected pulse is impinging on the SPAD detector, so the time at which the SPAD detects the reflected photon may not coincide accurately with a peak of the reflected light pulse. Next, photons reflected from nearby objects may not be from objects of interest.

To account for such issues, the TOFs of multiple received photons over multiple PRIs are obtained for a pixel. A detected peak in the distribution of TOF values can then be taken as the actual TOF of photons reflected from an object of interest. Such a statistical measurement for the TOF can be implemented by a histogram of TOF values recorded over multiple PRIs for a pixel. Each bin of such a histogram represents a particular subinterval of time of the PRIs, and each bin can store a count of photons received at the SPAD during that subinterval of time over all the PRIs, or equivalently, a count of photons having times of flight within that subinterval of time. Each bin also effectively represents a range of distances to an object. Bins associated with smaller subintervals of time provide finer resolution of a distance determination.

As mentioned above, objects at different distances may create conflicting issues for detection of reflected light photons. Objects that are far from the SPAD detector may produce few detectable reflected photons, whereas nearby objects may produce enough reflected photons to saturate the pixels leading to a bias in TOF estimation. Consequently, varying the sensitivity of a SPAD (e.g., by adjusting its reverse bias) may improve estimation of distance to far objects but reduce accuracy of estimated distance to close objects.

Various techniques are disclosed for varying the sensitivity of one or more sections of the pixel array in the SPAD detector over time to address the above described and other issues. The sensitivity of the entire pixel array in the SPAD detector may be modulated, or the sensitivity of one section of the pixel array can be modulated differently from another section of the pixel array. In one non-limiting example, the pixel array can have a first sensitivity to light emitted by an emitter (e.g., a laser) and reflected off objects (e.g., a target) positioned at a first distance from the SPAD detector (e.g., nearer the SPAD detector) and a higher second sensitivity for light emitted by the emitter and reflected off objects located at a second distance from the SPAD detector (e.g., farther from the SPAD detector).

In one particular embodiment, the histograms that are constructed for at least some SPADs are non-uniform histograms. The sensitivity of such SPADs can be modulated or adjusted by constructing the histograms as non-uniform histograms. The phrase "non-uniform histogram" refers to a histogram in which the bins represent subintervals of time of the PRIs that have different time durations. (This will be expressed as saying the bins have different widths, even though it is the bins' respective subintervals of time that have different widths.) For example, a histogram can include a first set of bins having a first width (each width representing a range of TOF values) and a second set of bins having a second width (each width representing another different range of TOF values). Continuing with this example, each bin in the first set of bins can represent a time period of two nanoseconds and each bin in the second set of bins may represent a time period of four nanoseconds. Collectively, all of the bins cover the time span between a minimum TOF and a maximum TOF that might be of interest. The time span may span the entire PRI, or just a section thereof. For example, as discussed below, during an initial interval of time at the start of each PRI, the SPADs may be disabled so as not to detect any photons. Thereafter, photons detected in the subsequent subinterval of time would add to the photon count stored in the first bin of the histogram. In still other embodiments, the bins may be selected to represent more than one distinct subinterval of the PRIs. Each set of bins may include one or more bins. Some or all of the bins in each set may abut one another or may be distributed throughout the histogram.

The varying bin widths provide a SPAD detector with different sensitivities. For example, the width of the bin(s) in the first set of bins can be narrower than the width of the bin(s) in the second set of bins. Accordingly, the first set of bin(s) can be considered to have a fine sensitivity or resolution and the second set of bins a coarse sensitivity. The first set of bins may be used to detect photons that reflect off objects in the scene that are closer to the SPAD detector (e.g., a close target). The coarse sensitivity can be used to detect photons that reflect off objects in the scene that are farther from the SPAD detector (e.g., a far target).

In another embodiment, the sensitivity of a SPAD detector can be modulated by varying the recharge time of the SPADs. In particular, the recharge time can be modified by adjusting one or more signals that are received by a quenching transistor connected to a SPAD. For example, in one embodiment, a gate signal applied to the gate of the quenching transistor may be varied by selectively connecting the gate to one of two or more gate signals, where each gate signal results in a different recharge time. For example, one gate signal can produce a slower recharge time while another gate signal may result in a faster recharge time. The slower recharge time can result in a sensitivity modulation where the leading segment of the recharge transient is characterized by a first sensitivity of the SPAD that is lower compared to a second sensitivity of the SPAD related to the trailing segment of the recharge transient. The faster recharge time may result in a SPAD having the highest sensitivity while exhibiting nominal (shortest) dead time performance.

Additionally or alternatively, the recharge time may be modified by varying the voltage supply connected to a terminal of the quenching transistor. The waveform of the signal received from the voltage supply can have any given shape. The waveform may increase initially and settle to a steady state value. For example, the waveform can include a linearly increasing portion that causes the sensitivity of the SPAD to increase linearly. At a point, the waveform may transition to a constant value, which maintains the sensitivity of the SPAD at a particular sensitivity (e.g., a maximum sensitivity).

These and other embodiments are discussed below with reference to FIGS. 1-22. However, those skilled in the art will readily appreciate that the detailed description given herein with respect to these Figures is for explanatory purposes only and should not be construed as limiting.

FIG. 1 illustrates one example of a system 100 that includes one or more SPAD detectors, each SPAD detector including an array of pixels. The system 100 includes an emitter 102, and a SPAD detector 104 positioned in relationship to an object or target 106. The emitter 102 and the SPAD detector may be a single unit. In the system shown in FIG. 1, the emitter 102 and the SPAD detector 104 may each represent one or more emitters and SPAD detectors, respectively. The emitter 102 is positioned to emit light towards the target 106, or into a field of view, and the SPAD detector 104 is situated to detect light reflected from the scene and/or the target 106.

A processing device 108 is operably connected to the emitter 102 and to the SPAD detector 104. The processing device 108 causes the emitter 102 to emit light towards the target 106 (emitted light represented by arrow 110). The light reflected from the target 106 and/or the scene may be detected by the SPAD detector 104 (reflected light represented by arrow 112). The processing device 108 receives the output signals from the SPAD detector 104 or receives conditioned output signals from intervening signal processing components (not shown). The processing device 108 processes the output signals to determine one or more characteristics associated with the reflected light, the target 106, and/or the scene. The particular components and operations discussed for system 100 are exemplary; in other embodiments the operations discussed may be distributed among the components differently.

The system 100 may be used as part of an electronic device, such as a camera in a mobile phone, that scans a field of view (FOV). In scanning systems light is emitted into the FOV and information about objects or targets in the FOV is determined from reflections of the emitted light. Scanning systems may emit light in multiple directions from multiple emitters, or by sweeping a light (such as from a laser) in one or more directions across some or all of the FOV. A scanning system may use multiple sweeping light emitters, which may sweep the FOV in different directions or patterns.

Alternatively, the system 100 may be part of an electronic device in which the illumination of the FOV is not scanned but rather is illuminated in fixed directions, such as by one or multiple emitters. In such systems (e.g., fixed pattern systems), one or multiple light pulses may be emitted (e.g., multiple contemporaneously-emitted pulses), and each emission may be directed or disbursed in one or more directions. For example, in a facial recognition system, multiple directions may be selected for a first set of simultaneous emissions. The various reflected pulses may then be used to detect the distinguishing facial features of a user. For a second set of emissions, the directions may be reselected and varied.

Figure 2:
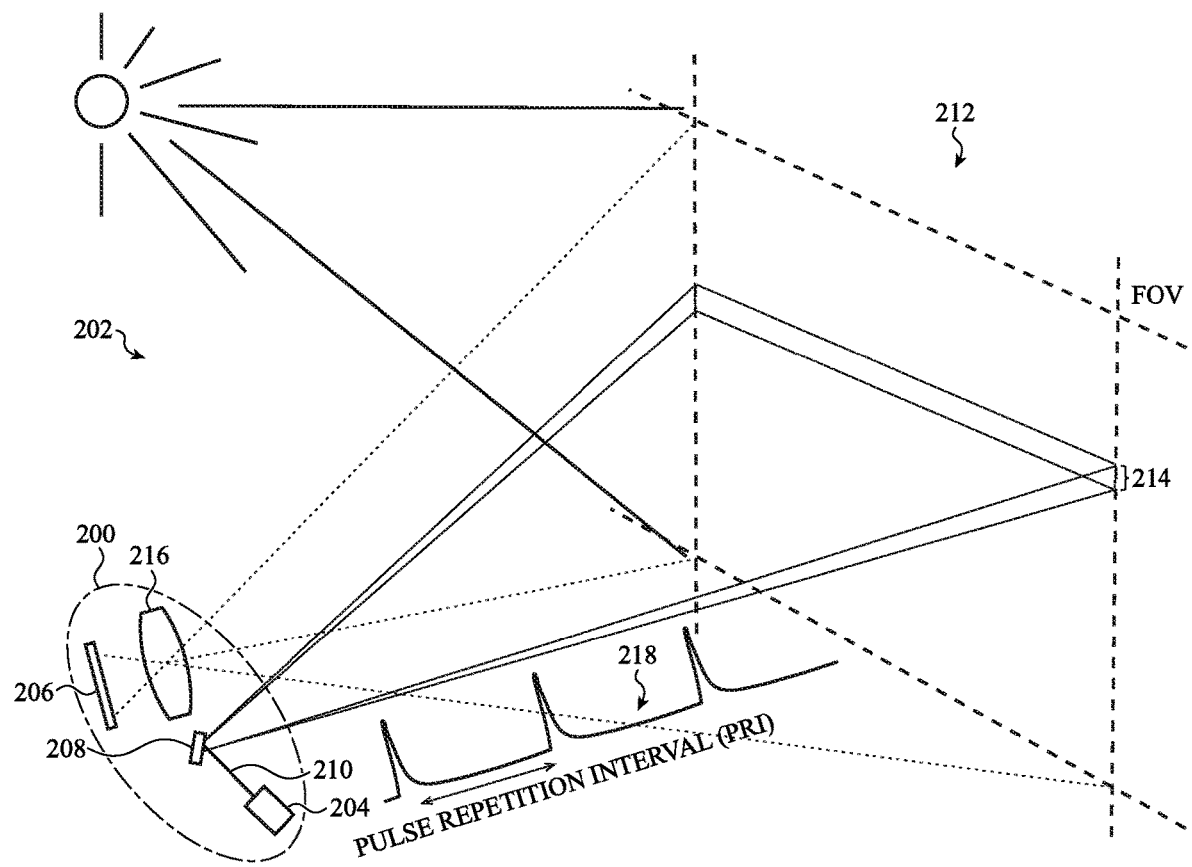
FIG. 2 depicts one example of a line scan system.

In some embodiments, a SPAD detector is used in a line scan system. FIG. 2 depicts one example of a line scan system 200 that uses a SPAD detector positioned in an environment 202. While this description will hereafter discuss the embodiments as used with the line scan system 200, one of skill in the art will recognize how the embodiments can be used with other scanning systems, such as a fixed pattern system. The line scan system 200 includes an emitter 204 and a SPAD detector 206. The emitter 204 may be operated to repeatedly emit light pulses 218 over a period of time. The time period between each emitted light pulse is known as a pulse repetition interval (PRI).

Collectively, the light pulses 218 are referred to herein as an emitted light beam, or just a light beam 210. The light beam 210 may have an intended illumination area, volume, or emission pattern at any given moment in time. The light beam 210 is steered or directed towards a field of view (FOV) 212 so that only a section 214 (e.g., a line) of the FOV 212 is illuminated at a time. The FOV 212 is scanned section-by-section during a FOV detection period. The FOV detection period is the time period needed to scan a selected part of the FOV 212.

The light that is returned to the device (e.g., via reflections off a target and/or the scene in the FOV 212) is received by a lens 216 that directs the light onto the SPAD detector 206. Since the emitted light beam 210 is a series of light pulses 218, the reflected light is comprised of a series of light pulses. As will be described in more detail later, sections of the pixels in the SPAD detector 206 detect the reflected light pulses through a series of line scan operations. Each scan operation involves the emission of multiple light pulses and detection of reflected photons by selected pixels of the array. Each line scan operation scans or reads out the pixels in a section of the pixel array (e.g., two or three columns at a time). Reading out pixels can involve receiving the output signals produced by the pixels' SPADs, and possibly performing amplification or other conditioning of the output signals. When the line scan operation for one section of pixels is complete, another section of pixels is scanned. In one embodiment, the next section of pixels includes some of the pixels in the previous line scan operation. In another embodiment, the next section of pixels includes different pixels from the pixels in the previous line scan operation. This process repeats until all of the pixels within a chosen subset of pixels of the array have been scanned.

In one embodiment, a beam-steering element 208 (e.g., a mirror) is positioned in the optical path of the emitter 204 to steer the light beam 210 emitted by the emitter 204 towards the FOV 212. The beam-steering element 208 is configured to control the propagation angle and path of the light beam 210 so that only a section 214 of the FOV 212 is illuminated at a time.

The light beam 210 can be steered differently in other embodiments. For example, the emitter 204 can include multiple emitters that each emits light toward a different section of the FOV 212. In additional and/or other embodiments, the emitter may be moved or rotated to emit the light toward different sections of the FOV 212.

Figure 3:
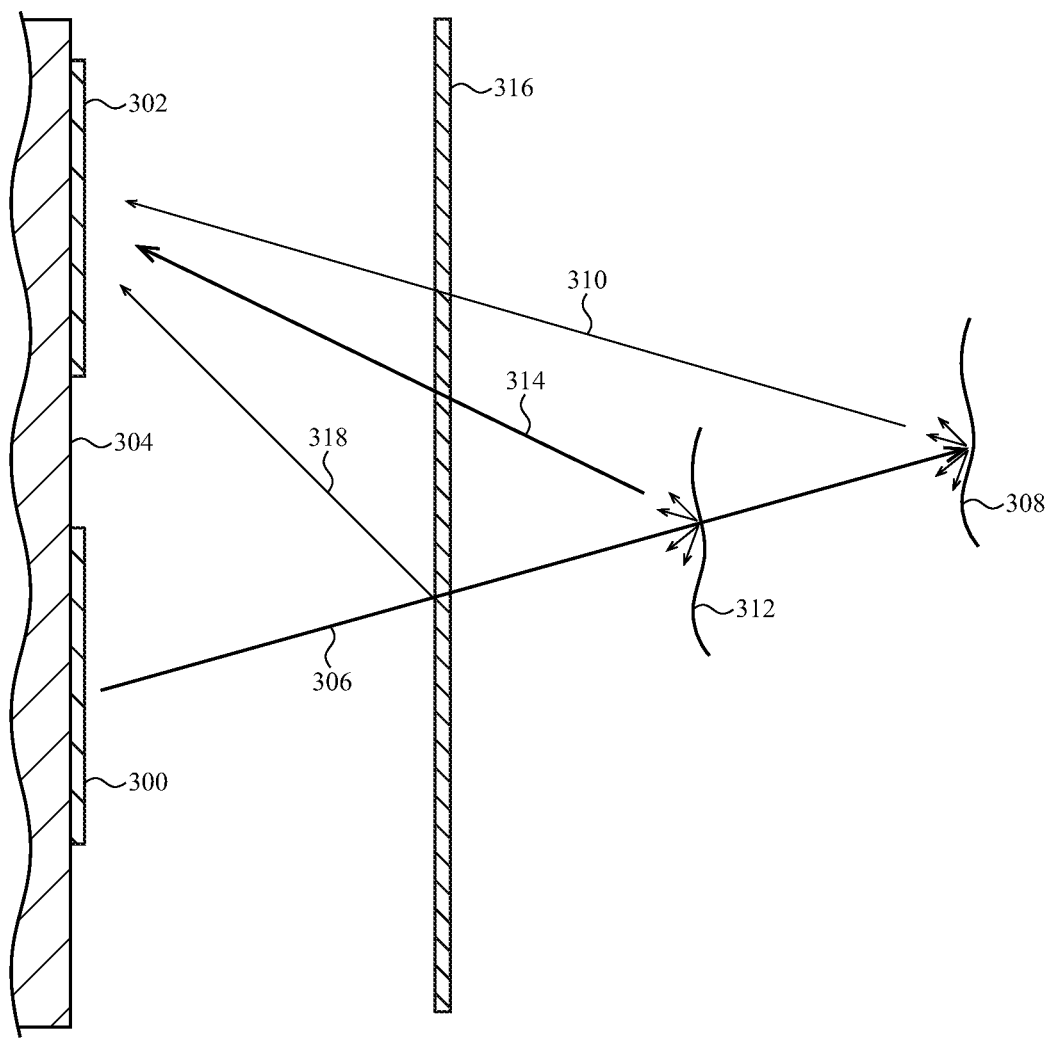
FIG. 3 shows an expanded view of an emitter and SPAD detector in a SPAD system.

FIG. 3 depicts an expanded view of an emitter and a SPAD detector in a SPAD system. In the illustrated embodiment, the emitter 300 and the SPAD detector 302 are disposed on a common substrate or support structure 304, although this is not required. The emitter 300 and the SPAD detector 302 may be positioned on separate substrates in other embodiments.

The emitter 300 is a laser or other suitable light source that emits light 306 towards a target or FOV over a given period of time. In some embodiments, such as in the line scan system 200, the emitter 300 repeatedly emits a light pulse (e.g., light pulses 218 in FIG. 2) during a FOV detection period, i.e., a time interval allotted by the system for detecting objects in the FOV and determining their distances. The waveform produced by the photons of an emitted light pulse generally has a substantially concentrated shape, such as a symmetric bell curve shape (e.g., a Gaussian shape), although such a shape is not required. When a target 308 is sufficiently far from the SPAD detector 302, a reflected waveform that is substantially undistorted and corresponds to the waveform of the transmitted light pulse is received at, or impinges on, the SPAD. The received waveform represents the number of photons in a reflected light pulse that impinges on the SPAD detector 302. As will be discussed further below, each SPAD of the pixel array is unlikely to receive and detect (i.e., be sent into avalanche) more than a limited number of photons of each reflected light pulse impinging on the SPAD detector 302.

Figure 4:
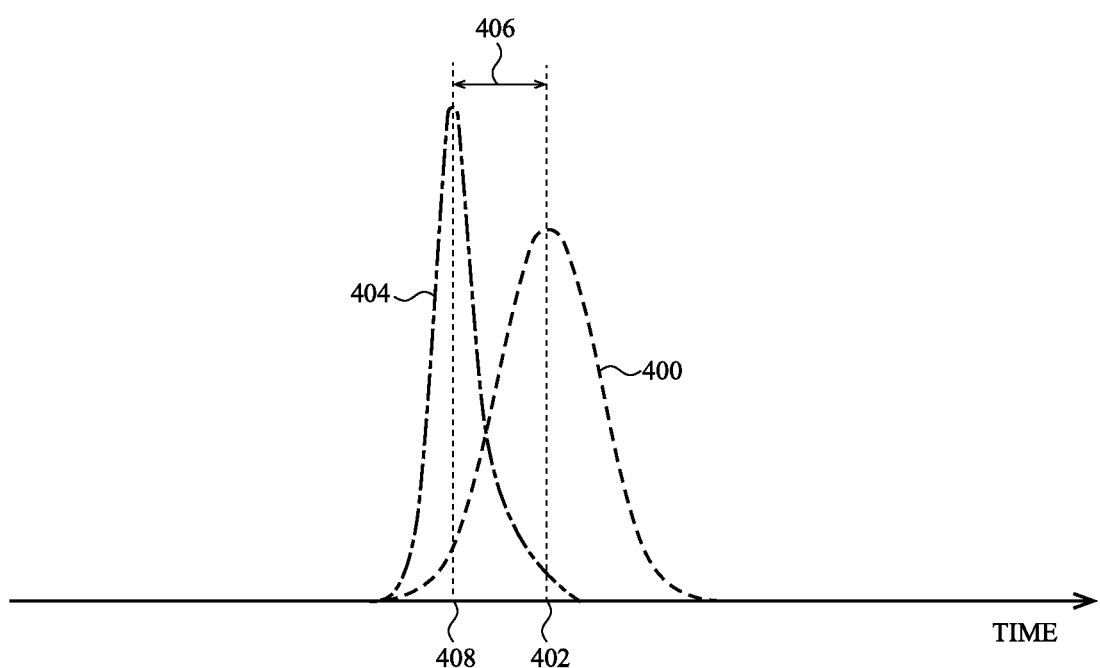
FIG. 4 shows two waveforms detected by a SPAD.

An example of an undistorted reflected waveform 400 is depicted in FIG. 4. When the waveform of a transmitted light pulse is Gaussian-shaped, the shape of the reflected waveform 400 impinging on the SPAD detector 302 is also substantially Gaussian, which can be used to make a substantially precise determination of the TOF (point 402). The TOF is a measurement of the amount of time that elapsed between the emitter emitting a light pulse and the SPAD detector detecting photons in the reflected light pulse. The reflected waveform 400 represents the number of photons in the reflected light pulse that impinge on the SPAD detector 302 as a function of time. The TOF ideally could be estimated as the time from the peak of the emitted Gaussian shape to the arrival of the peak amplitude of the reflected waveform 400.

However, for any particular SPAD pixel in the array, for each received reflected light pulse impinging on the array, typically only a few photons will be detected. One reason for this is that an individual SPAD has a charge recovery time after a photon generated avalanche current output. During the charge recovery time the SPAD is not able to detect (i.e., be sent into avalanche) other arriving photons. But for those photons that are detected during one reflected light pulse, a time of flight can be determined, such as by using a system clock to measure the time elapsed from the emission of the light pulse to the time of the avalanche output. By taking such TOF measurements over multiple PRIs, the distribution of the TOF values at the particular SPAD can form a waveform corresponding to an individual reflected waveform 400.

Referring again to FIG. 3, when a target 312 is close to the SPAD detector 302, or the target has a high reflectivity (e.g., a mirror), the photons in the reflected light 314 impinge sooner on the SPAD detector 302 compared to the photons received from the target 308. The photons in the reflected light 314 can saturate one or more SPADs in the SPAD detector 302. In instances in which the target is close, the detected photons at a particular SPAD are more likely to be from the initial part of the received reflected waveform and so be measured with a TOF that is less than a TOF based on the peak of received reflected waveform. Over multiple PRIs, the result for a particular SPAD is a net received waveform that is distorted. Using the peak of the distorted waveform can result in an incorrect TOF determination.

In further detail, after a photon is detected by triggering an avalanche in a SPAD, the SPAD enters a recovery or dead time period during which the SPAD does not detect or respond to other incident photons. Typically, a dead time period is 10-100 nanoseconds, which means a SPAD is "blind" to subsequent photons for that amount of time. As a result, the probability that a SPAD will detect photons is higher in the leading portion of the laser pulse (e.g., when the SPAD begins receiving the reflected light) when compared to the trailing portion of the laser pulse. These differences in probability result in the skewed and narrower received waveform. While the same skew is possible with photons reflected from an object that is far from the SPAD detector, the reduced probability of a particular SPAD detecting any photon in any one reflected pulse implies that over multiple PRIs, the particular SPAD may detect photons with less bias toward those photons of the leading portion. For an object far from the SPAD, any residual skew or bias would produce a smaller relative error in an estimated distance to the object.

An example distorted received waveform 404 is depicted in FIG. 4. The distorted received waveform 404 is shifted in time and is closer to zero. Additionally, the shape of the distorted waveform is narrower and less Gaussian. Accordingly, a bias error 406 is introduced into the TOF, shifting the TOF to an incorrect earlier TOF 408. Generally, the earlier TOF 408 indicates the distance between the SPAD detector 302 and the target 312 is less than the actual distance between the SPAD detector 302 and the target 312.

Internal reflections within a SPAD system can also affect the TOF determination. Typically, a cover layer 316 (FIG. 3) is positioned over the emitter 300 and the SPAD detector 302. The cover layer 316 may be made of any suitable material, including glass and plastic. When the light 306 propagates through the cover layer 316, some of the light 306 may reflect off the cover layer 316 to become cover reflected light 318, and depending on the optical design of the system, may reach the SPAD detector 302. The photons in the cover reflected light 318 can be detected by one or more SPADs in the SPAD detector 302, which causes the SPAD(s) to enter the dead time period. Accordingly, in some situations, a SPAD fails to detect photons in the reflected light 310, 314 reflected from objects because the SPAD is in a dead time period caused by the detection of the photon(s) in the cover reflected light 318 reflected from the cover layer 316.

The issue of near/far distance determination to an object just discussed can be addressed by adapting sensitivities of individual SPADs or sections thereof within the pixel array. Various techniques are disclosed herein for modulating the sensitivity of one or more sections of the SPAD detector over time. The SPAD detector includes a pixel array, where each pixel includes a SPAD, a quenching transistor operably connected to the SPAD, and a gating transistor operably connected to the SPAD. The sensitivity of the entire pixel array in the SPAD detector may be modulated, or the sensitivity of one section of the pixel array can be modulated differently from another section of the pixel array. In one embodiment, the sensitivity of the SPAD can be lower during a time period in which light may reflect from objects that are closer to the SPAD detector. Conversely, the sensitivity of the SPAD may be higher (e.g., maximized) during a time period in which light may reflect from objects that are farther from the SPAD detector. In some embodiments the sensitivity may be implemented without necessarily adjusting electrical inputs (such as biasing voltages) to the individual SPADs by using non-uniform histograms for determining a TOF.

Figure 5:
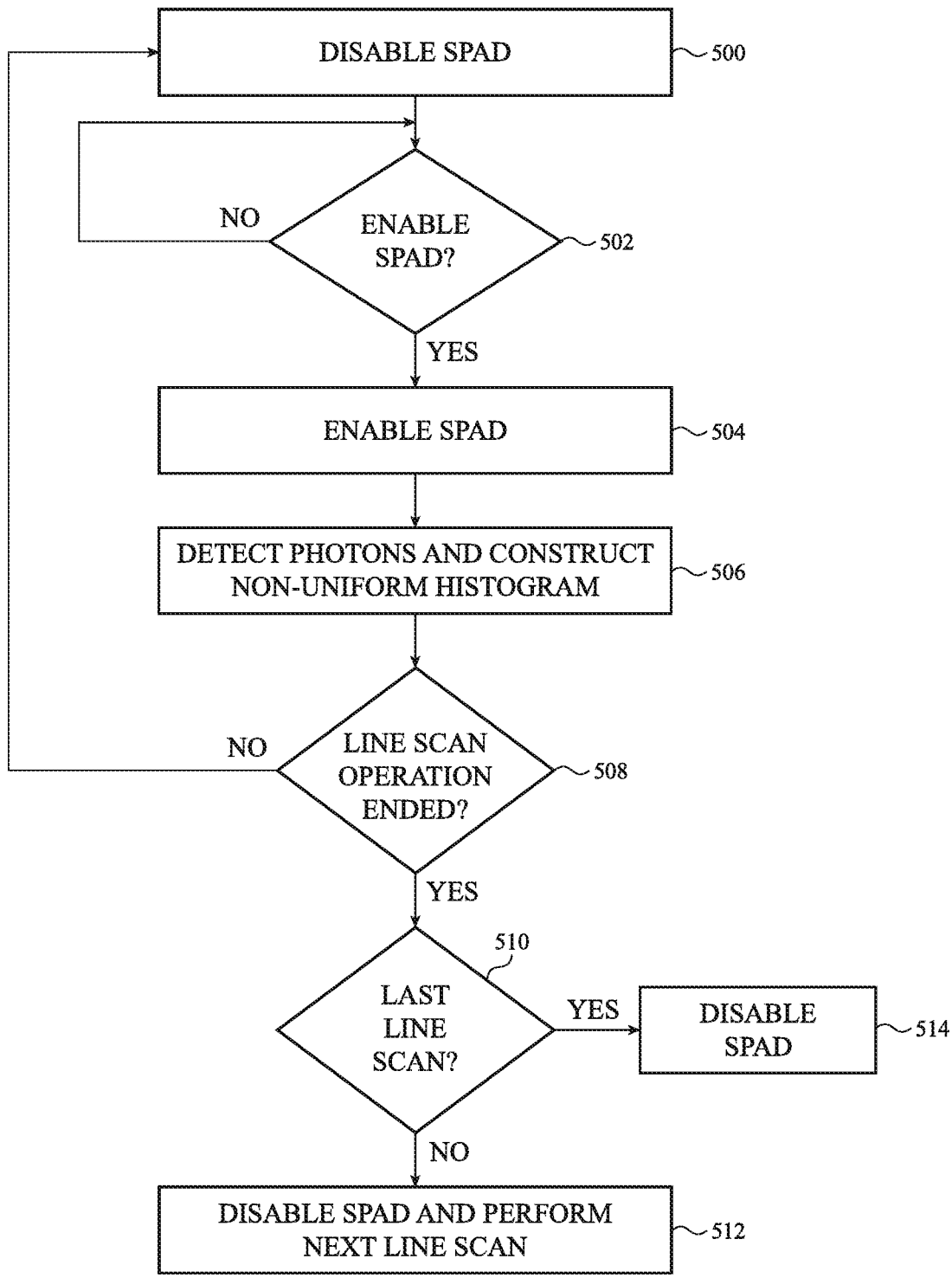
FIG. 5 illustrates a flowchart of an example method of operating a SPAD detector.

FIG. 5 illustrates a flowchart of an example method of operating a SPAD detector during a line scan operation. As noted previously, those skilled in the art will recognize that the method can be used with other types of scanning operations of the FOV. The method is described in conjunction with a SPAD in one pixel. Those skilled in the art will appreciate that the method can be used simultaneously or sequentially with SPADs in multiple pixels. That is, the method can be applied to those pixels at which the reflected light pulse is received or expected to be received. As described earlier, the pixels in the pixel array are scanned or read out section-by-section. A line scan operation corresponds to the scanning of one section of the pixel array (e.g., two or three columns of pixels).

Initially, as shown in block 500, the operation of the SPAD is disabled. The SPAD may be in one of at least three states. An "enabled," or "activated," state in which the SPAD section is reverse biased sufficiently so that any received photon can trigger an avalanche output signal; an idle state in which power is supplied to the components of the pixel but not to the extent that a photon impinging the SPAD can trigger an output signal; and an unpowered state (e.g., no reverse bias is applied to the SPAD). A disabled state encompasses both the idle and unpowered states. An example technique for disabling or gating the operation of the SPAD is described in more detail in conjunction with FIG. 9.

A determination is then made at block 502, such as by the processing device 108, as to whether the SPAD is to be enabled. The SPAD may be enabled after a period of time in which data that is considered undesirable and/or immaterial has ended. For example, the SPAD may be enabled after a cover layer reflection time period has ended. In one embodiment, one or more separate reference SPADs (i.e. SPADs of reference pixels as defined below in relation to FIG. 6) are used to construct a histogram during the time period the SPAD is disabled. The histogram is used to determine the time when the SPAD should be enabled. The histogram can be a uniform or a non-uniform histogram that is constructed separately and independently from the non-uniform histogram that is constructed at block 506 described below and used for TOF determinations. In another aspect, the determination to enable the SPAD is based on an anticipated or expected location of reflected light pulses. For example, in line scan operation only pixels in certain rows of the array may be enabled based on the system's knowledge the direction of the emitted light pulses.

In another embodiment, the time period in which light reflected from the cover layer may be chosen based on the distance between the SPAD detector and the cover layer. This time period is referred to as the cover layer reflection time period. The operation of the SPAD can be disabled during the cover layer reflection time period and enabled after the cover layer reflection time period ends. In still further embodiments the SPAD may be disabled for longer than just the cover layer reflection time period. This may be done if it is desired to exclude from distance determinations objects or targets within a certain distance to the system using the SPAD detector.

Returning to FIG. 5, the method waits at block 502 if the cover layer reflection time period has not ended. When the cover layer reflection time period (or the extended amount thereafter) has passed, the process continues at block 504 where the operation of the SPAD is enabled to detect photons in the light reflected from the target and/or the scene. At block 506, the SPAD detects photons and a non-uniform histogram is constructed. A SPAD may or may not be disabled between pulses, although disablement between pulses may be preferred to save power and reduce the impact of internal/close object reflections. An example non-uniform histogram is discussed in more detail in conjunction with FIG. 8. In some cases, a non-uniform histogram may be constructed per pixel. In other cases, a non-uniform histogram may be constructed for a super-pixel (e.g., a set of pixels).

A determination is then made at block 508 as to whether the line scan operation has ended. If not, the method returns to block 500. When the line scan operation ends, the process passes to block 510 where a determination is made as to whether the line scan operation was the last line scan operation (e.g., all of the SPADs in the pixel array have been scanned). If the line-scan operation is not the last line scan operation, the process continues at block 512 where the SPAD is disabled and the next line scan operation is performed. The next line scan operation may include the SPAD enabled at block 504 or it can include a different SPAD. If the line scan operation is the last line scan operation, the method passes to block 514 where the SPAD is disabled.

Figure 6:
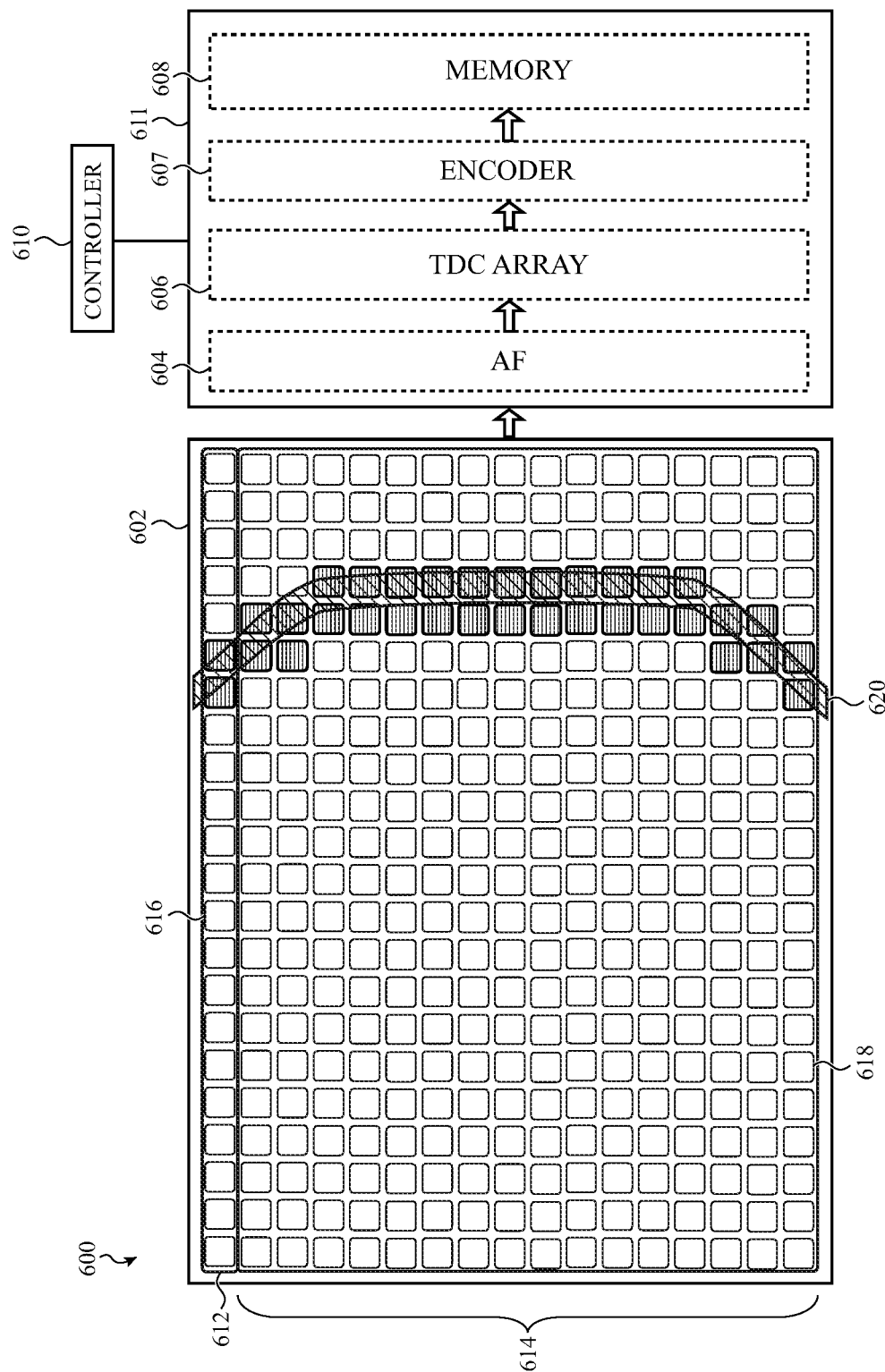
FIG. 6 shows a block diagram of a SPAD detector.

FIG. 6 shows a block diagram of a SPAD detector. The SPAD detector 600 includes a pixel array 602 operably connected to readout and control circuitry 611. The readout and control circuitry 611 is controlled by the controller 610, which may be implemented as part of the processing device 108 or as a separate component operably connected to the processing device 108. The readout and control circuitry 611, in some embodiments, may include any or all of a row-level analog front-end (AF) circuit array 604, a time-to-digital converter (TDC) array circuit 606 operably connected to the AF circuit array 604, and a memory 608 operably connected to the TDC array circuit 606. In some embodiments, an optional encoder 607 may be operably connected between the TDC array circuit 606 and the memory 608.

The pixel array 602 includes a reference sub-array 612 and an imaging sub-array 614. The reference sub-array 612 is depicted as a row of pixels 616, termed reference pixels, positioned along an edge of the imaging sub-array 614. Other embodiments can include one or more reference sub-arrays that each includes one or more reference pixels. Additionally, the one or more reference sub-arrays can be situated at any given location or locations within or around the imaging sub-array 614.

The SPADs in the reference pixels 616 in the reference sub-array 612 may be used to detect photons in the light reflected from the cover layer, while the SPADs in the pixels 618, termed imaging pixels, in the imaging sub-array 614 are used to detect photons in the light reflected from the FOV (e.g., FOV 212 in FIG. 2). A SPAD of a reference pixel will be referred to as a reference SPAD, and a SPAD of an imaging pixel will be referred to as an imaging SPAD. At the start of a PRI, when photons may reflect off the cover layer, the SPADs in the imaging pixels 618 in the imaging sub-array 614 are disabled. The SPADs in the reference pixels 616 in the reference sub-array 612 are used to determine the time when the SPADs in the imaging pixels 618 are to be enabled.

In some embodiments, the SPADs in the reference pixels 616 in the reference sub-array 612 are enabled at the start of the PRI and disabled to reduce power consumption when the SPADs in the imaging pixels 618 are enabled. Alternatively, the reference pixels 616 may be used as both reference pixels and imaging pixels. The reference pixels 616 can transition from use as reference pixels to use as imaging pixels when the imaging pixels 618 are enabled. For example, the outputs associated with the SPADs in the reference pixels 616 can be switched between the circuitry associated with the reference function (e.g., TDC output values associated with reference functionality) to the circuitry associated with the imaging function (e.g., TDC output values with non-uniform characteristics in the context of FIG. 10). In some examples, the reference pixels 616 may not be disabled before enabling the imaging pixels, and there may be some overlap during which both the reference and imaging pixels are enabled. In other words, during a given PRI, a reference pixel may be enabled before an imaging pixel is enabled, and the reference pixel may be disabled before the imaging pixel is disabled.

In a line scan system, the pixel array 602 can be read out in a scan-by-scan readout process. The pixel array 602 can also be read out on a section-by-section basis in systems using a moving illumination source. In other words, the SPADs in the imaging pixels 618 of various sections of the pixel array 602 (e.g., two or three columns of pixels) are enabled at respective times. In some embodiments, there may be multiple readouts of individual pixels (e.g., for individual pulse-based measurements) within a scan operation, so that readout is not performed section-by-section. In one embodiment, only the SPADs in the reference pixels 616 in the reference sub-array 612 are enabled during the cover layer reflection time period and only the SPADs in the imaging pixels 618 in the imaging sub-array 614 are enabled during the line scan operations. Alternatively, the SPADs in the reference pixels 616 are enabled during the cover layer reflection time period as well as during the line scan operations. A representative reflected light beam 620 is shown impinging on the pixel array 602, and the pixels with the cross-hatching represent the pixels whose SPADs are enabled to detect the photons in the reflected light beam 620.

The pixels with enabled SPADs constitute a subset of the pixels in the pixel array 602. The pixels with enabled SPADs are arranged in a non-linear arrangement in FIG. 6. In particular, the pixels with enabled SPADs near the two horizontal edges of the pixel array form a curved (or offset, or staggered) pattern to account for the shape of the reflected light beam 620 received from a lens. Other non-linear arrangements of pixels with enabled SPADs may comprise piecewise linear sections of such pixels, or at least one row with a set of one or more enabled pixels in one or more columns (but not in all columns), or adjacent rows with enabled pixels which may have one or more inactive rows positioned therebetween and/or enabled pixels in a same column (with enabled pixels in a column separated by one or more inactive rows). In other embodiments, the pixels with enabled SPADs may be arranged in a linear arrangement, e.g., they may be the pixels across a set of adjacent rows. In variations on these embodiments, pixels within the specific columns of the adjacent rows may not be enabled. One of skill in the art will recognize that the pattern of pixels with enabled SPADs can be arranged in any given arrangement. In some examples, the enabled or active pixels may include non-contiguous pixels or sets of pixels (e.g., in systems that do not employ line scan systems).

The AF circuit array 604 is configured to perform row-level signal readout for the pixel array 602. The AF circuit array 604 includes N AF circuits for each line of pixels (e.g., a row) in the pixel array 602, where N represents the number of enabled SPADs at any given time in the line(s) of pixels. Thus, for the embodiment shown in FIG. 6, the AF circuit array 604 includes two AF circuits for each row. In other embodiments, the number of AF circuits for each row may be N+X, where X represents one or more additional AF circuits. In one embodiment, the additional AF(s) can enable the SPAD detector 600 to selectively and dynamically adjust the number of pixels with simultaneously enabled SPADs.

The TDC array circuit 606 includes N TDC circuits for each line of pixels (e.g., a row) in the pixel array 602, where N represents the number of enabled SPADs at any given time in the line(s) of pixels. Thus, for the embodiment shown in FIG. 6, the TDC array circuit 606 includes two TDC circuits for each row. In other embodiments, the number of TDC circuits for each row may be N+Y, where Y represents one or more additional TDC circuits. In one embodiment, the additional TDC circuits can enable the SPAD detector 600 to selectively and dynamically adjust the number of pixels with simultaneously enabled SPADs.

The TDC circuits measure the arrival time of the photons impinging on the enabled SPADs. Thus, the TDC output values represent the arrival times of the photons. The TDC output values are used to construct histograms for each pixel with an enabled SPAD (or "histograms for each enabled SPAD") during a line scan of the FOV.

Figure 11A:
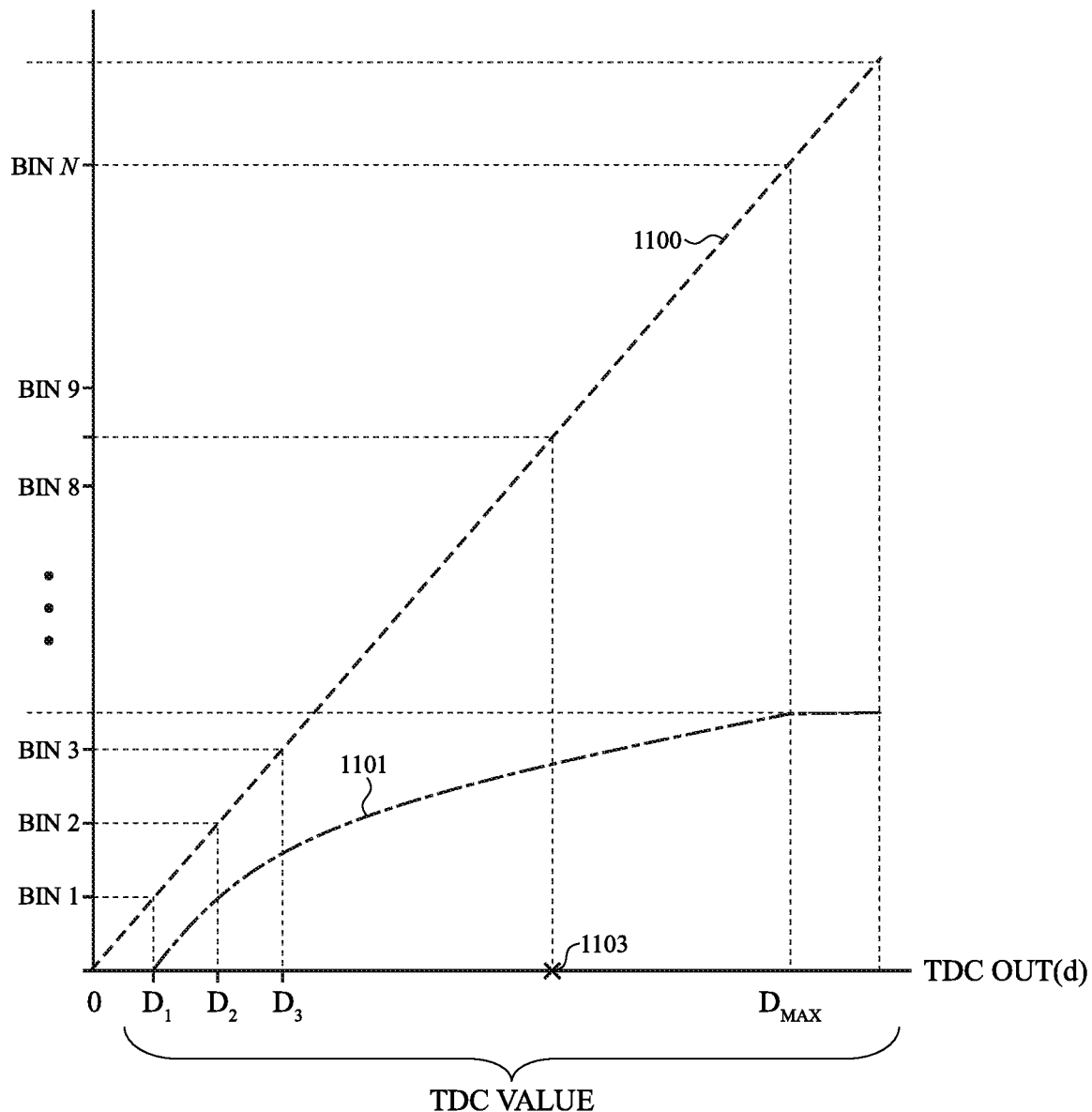
FIG. 11A depicts a first set of example relationships between a linear and a non-linear encoding of TDC output values and histogram bin numbers.
Figure 11B:
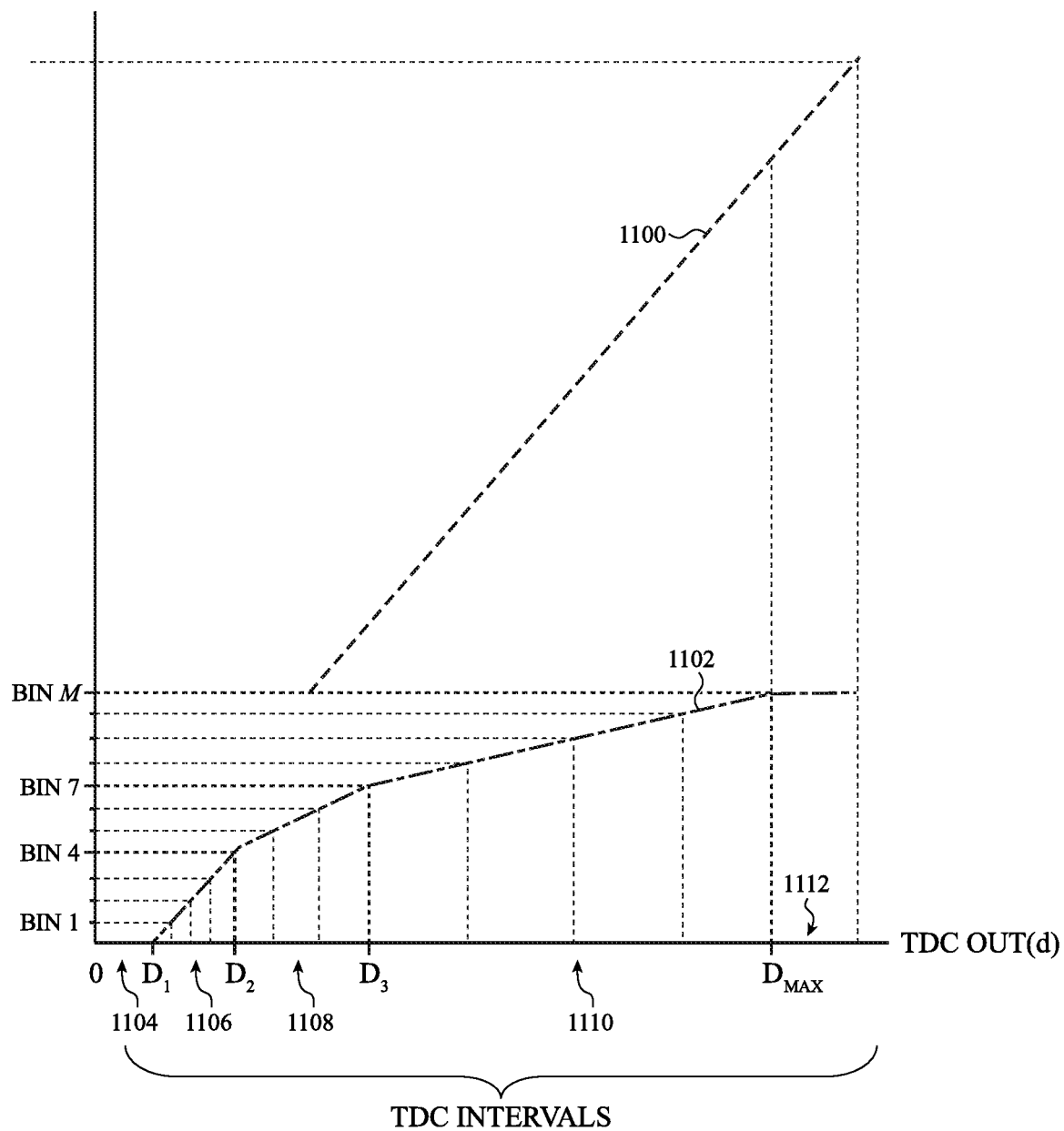
FIG. 11B depicts a second set of example relationships between a linear and a non-linear encoding TDC output values and histogram bin numbers.
Figure 12:
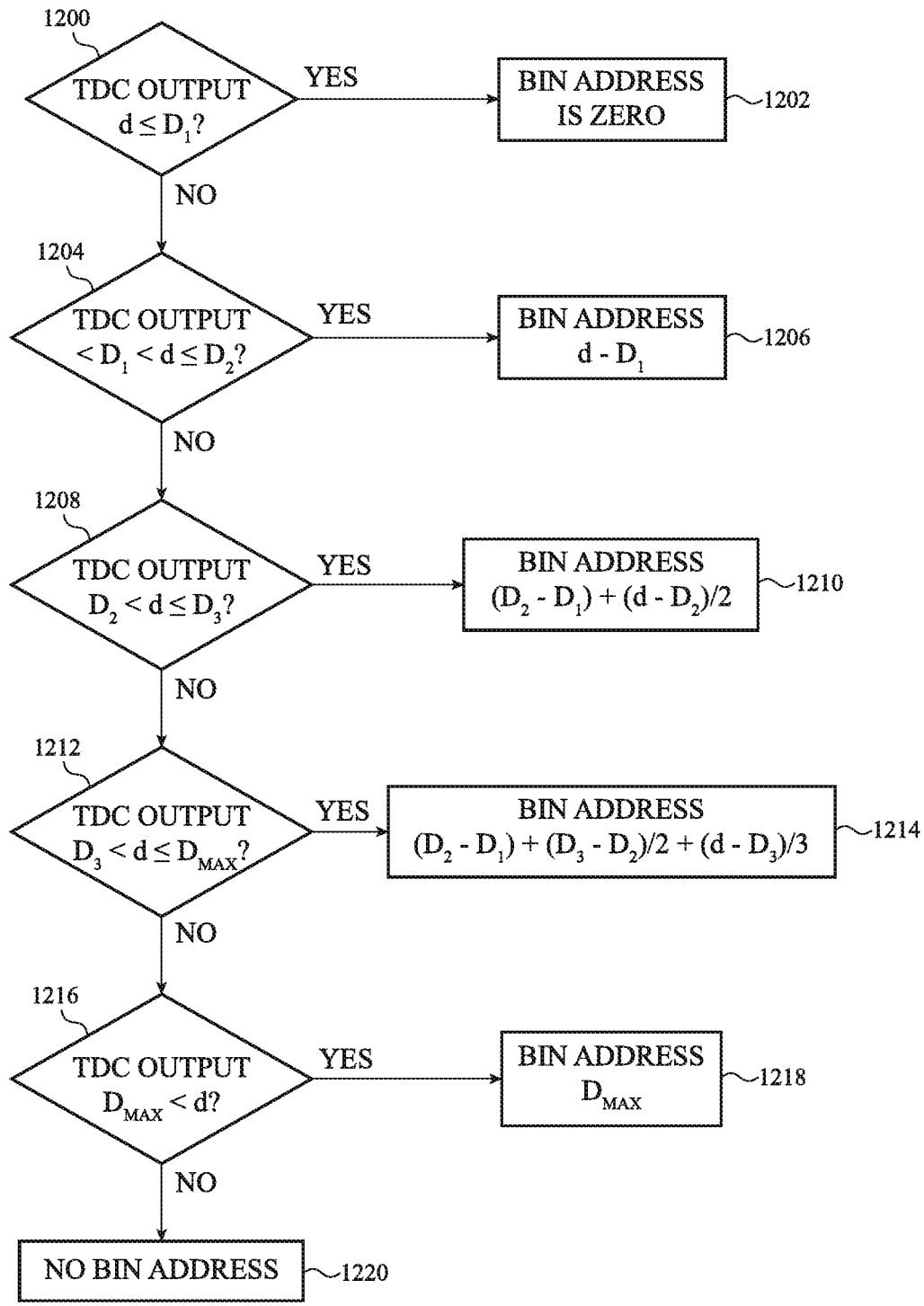
FIG. 12 shows an example method that can be used to perform the non-linear encoding of the TDC output values shown in the representative relationship shown in FIG. 11B.

The optional encoder 607 is discussed in more detail in conjunction with FIGS. 11A-12. In one embodiment, the memory 608 stores N histograms in N histogram memories for each line of pixels (e.g., a row) in the pixel array 602, where N represents the number of enabled SPADs at any given time in the line(s) of pixels. In other embodiments, the number of histogram memories for each row may be N+Z, where Z represents one or more additional histogram memories.

Embodiments described herein construct non-uniform histograms for each enabled SPAD. A non-uniform histogram is described in more detail in conjunction with FIG. 8.

The controller 610 generates timing signals for the TDC array circuit 606. Any suitable controller can be used. For example, the controller 610 may include ancillary circuitry to generate reference timing signals such as a phase-locked loop circuit or a delay-locked loop circuit.

Generally, a histogram for an enabled SPAD is constructed with multiple bins, where each bin represents a given period or span of time within each PRI of the emitter. The sum of the bin time span periods equals the PRI. Alternatively, the sum of the bin time span periods equals a selected interval of the PRI, such as when an initial and final subinterval of the PRI are excluded. In uniform histograms, the time span represented by each bin is the same length of time. Thus, the "widths" or time spans of the bins are consistent across the histogram. Each bin of the histogram may be used to store the total number of photons detected by the enabled SPAD over multiple PRIs in the time span it represents.

Figure 7:
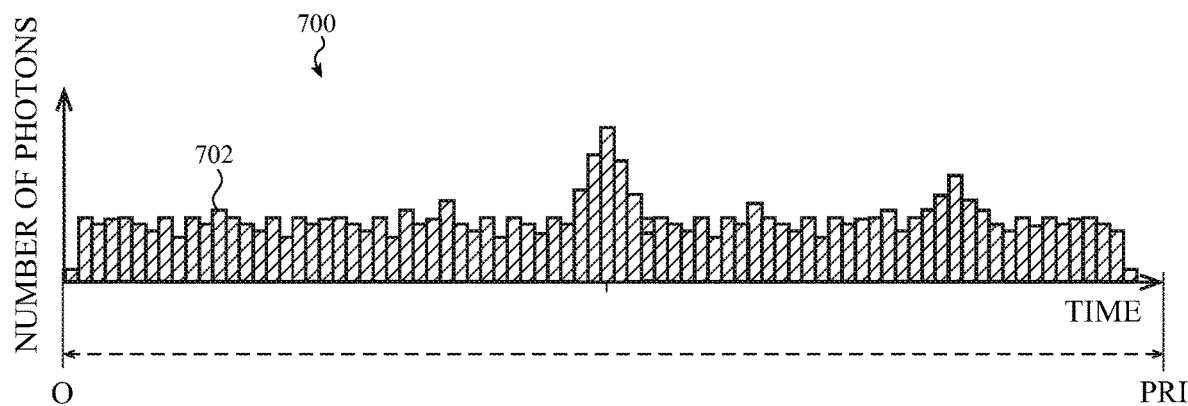
FIG. 7 shows one example of a uniform histogram.

FIG. 7 illustrates a uniform histogram for one enabled SPAD. The histogram 700 is constructed over multiple PRIs (see FIG. 2) and represents the total number of photons that are detected by the SPAD during the PRIs. The vertical axis (e.g., y axis) of the histogram 700 represents number of photons and the horizontal axis (e.g., the x-axis) represents time. The bins 702 in the histogram 700 span the PRI. Each bin 702 represents a photon count over a particular span of time in the PRI. For example, each bin 702 can represent the number of photons that are detected over a span of five nanoseconds.

Every time an avalanche is triggered in the enabled SPAD, an "address" that corresponds to the TOF as measured by a corresponding TDC circuit is computed and the bin corresponding to that address is incremented by one. The histogram is stored in the memory 608.

Figure 8:
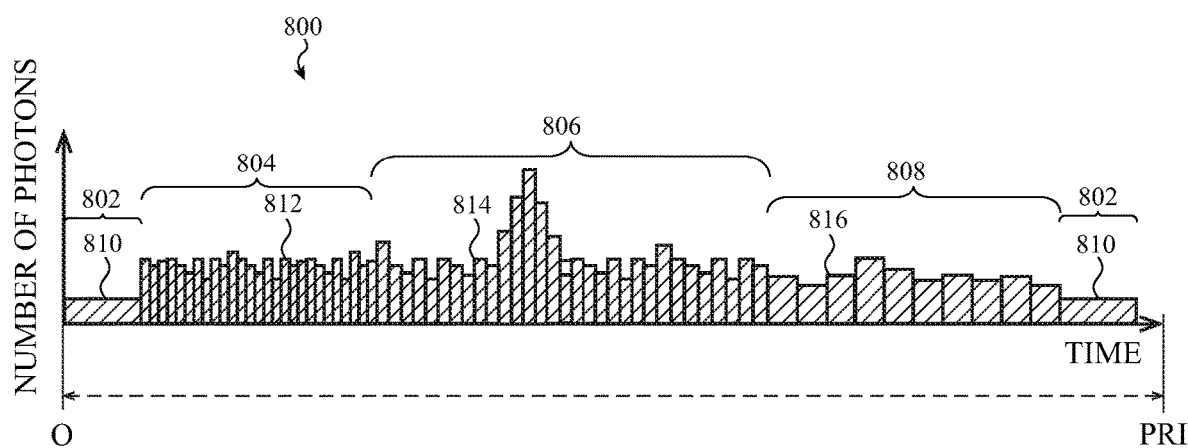
FIG. 8 shows one example of a non-uniform histogram.

As described earlier, the phrase "non-uniform histogram" refers to a histogram that includes bins that represent varying time spans across the histogram. An example non-uniform histogram is shown in FIG. 8. The non-uniform histogram 800 includes a first set of bins 802 having a first width or time span, a second set of bins 804 having a second width, a third set of bins 806 having a third width, and a fourth set of bins 808 having a fourth width. The sets of bins 802, 804, 806, 808 can each include one or more bins.

A non-uniform histogram can be used to effectively modulate the sensitivity of the pixels. The non-uniform bin widths can be chosen and fixed, or can be altered dynamically, such as by the processing device 108.

In the illustrated embodiment, the first set of bins 802 is situated at the start of the PRI and at the end of the PRI. The first set of bins 802 produces a coarse resolution or sensitivity for a SPAD detector. The bins 802 that are at the start of the PRI may have a different coarse resolution than those bins of bins 802 at the end of the PRI. A second set of bins 804 is positioned after the first set of bins 802 at the start of the PRI (e.g., the left-most first set of bins 802). The second set of bins 804 produces a fine resolution or sensitivity for the SPAD detector. The third set of bins 806 is situated between the second set of bins 804 and a fourth set of bins 808. The third set of bins 806 produces a fine sensitivity for the SPAD detector that is less fine than the fine sensitivity provided by the second set of bins 804. The fourth set of bins 808 produces a coarse sensitivity for the SPAD detector that is less coarse than the coarse sensitivity provided by the first set of bins 802. In other words, the third set of bins 806 produces a sensitivity that is less sensitive than the sensitivity provided by second set of bins 804 but more sensitive than the sensitivity produced by the fourth set of bins 808, and the fourth set of bins 808 provides a sensitivity that is less sensitive than the sensitivity produced by the third set of bins 806 and more sensitive than the sensitivity provided by the first set of bins 802. Thus, the sensitivity of the SPAD detector is coarse at the start of the PRI (first set of bins 802) and thereafter transitions to a finer (or less coarse) sensitivity (second set of bins 804). The sensitivity of the SPAD detector then decreases over the time remaining in the PRI by transitioning to bins having increasing coarser or less fine sensitivities (e.g., transition from the second set of bins 804 to the third set of bins 806; transition from the third set of bins 806 to the fourth set of bins 808; and finally transition from the fourth set of bins 808 to the first set of bins 802). In this manner, the different sets of bins 802, 804, 806, 808 modulate the sensitivity of the SPAD detector over the PRI.

In particular, the widths of the bins 810 in the first set of bins 802 each span the greatest length of time, which produces a first resolution or sensitivity for the pixel array. Typically, few photons are detected at the start of a PRI and at the end of the PRI. Accordingly, the bins 810 in the first set of bins 802 span a longer time period. As described earlier, the bins 810 in the first set of bins 802 provide the SPAD detector with the coarsest resolution or sensitivity.

The widths of the bins 812 in the second set of bins 804 each span the shortest length of time to produce a second sensitivity for the pixel array. Thus, the bins 812 in the second set of bins 804 provide the SPAD detector with the finest resolution or sensitivity.

The widths of the bins 814 in the third set of bins 806 each span a time period that is greater than the widths of the bins 812 and less than the widths of the bins 816 in the fourth set of bins 808. The bins 814 provide the SPAD detector with a fine resolution or sensitivity (less than the finest resolution and greater than the coarse resolution). As described earlier, the third set of bins 806 is used to create a third sensitivity for the pixel array.

The widths of the bins 816 in the fourth set of bins 808 each span a time period that is greater than the widths of the bins 814 and less than the widths of the bins 810 in the first set of bins 802. The bins 816 in the fourth set of bins 808 provide the SPAD detector with a coarse resolution or sensitivity (less than the fine resolution and greater than the coarsest resolution). The fourth set of bins 808 results in a fourth sensitivity for the pixel array.

Thus, the sensitivity of the SPADs can be modulated over time by varying the bin widths in the non-uniform histogram 800. The finest sensitivity can be used to detect photons that reflect from closer objects in the scene (e.g., a close target), and/or from objects that have a high reflectivity. The coarsest sensitivity is used to detect photons that reflect off farther objects in the scene (e.g., a far target). And the fine and the coarse sensitivities are used with photons that reflect from objects positioned between the close and far objects.

Figure 9:
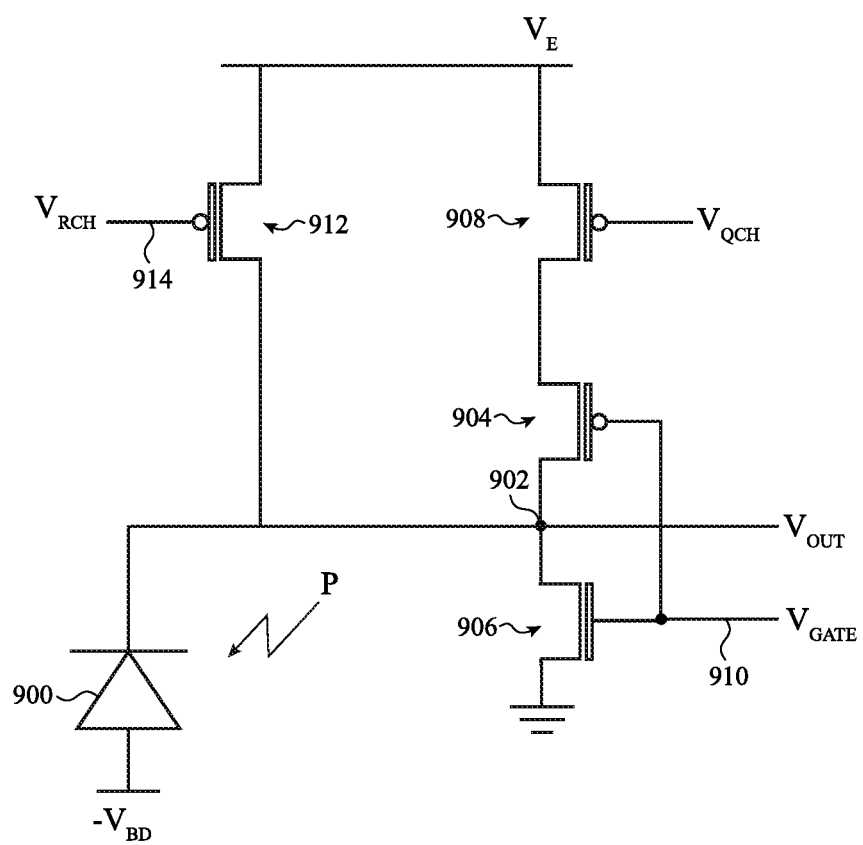
FIG. 9 shows a schematic diagram of an example pixel in a SPAD detector.

FIG. 9 shows a schematic diagram of an example pixel in a SPAD detector. A SPAD 900 is connected between a negative voltage source, $-V_{BD}$, and a node 902 on the output line on which voltage $V_{OUT}$ is taken. The SPAD 900 has the anode connected to the negative voltage source $-V_{BD}$ and the cathode connected to the node 902, though other embodiments are not limited to this configuration.

A first terminal of a select transistor 904 and a first terminal of a gating transistor 906 are also connected to the node 902. A second terminal of the gating transistor 906 is connected to a reference voltage (e.g., a ground). A second terminal of the select transistor 904 is connected to a first terminal of a quenching transistor 908. The second terminal of the quenching transistor 908 is connected to a voltage source $V_E$. The gates of the select transistor 904 and the gating transistor 906 are connected to a common input line 910. A gating signal $V_{GATE}$ is applied to the input line 910 to enable and select the SPAD 900 and to disable and deselect the SPAD 900. In other words, the gating signal $V_{GATE}$ determines the detection period of the SPAD 900. When the SPAD is enabled, avalanche events are detected on output line $V_{OUT}$. The output line $V_{OUT}$ can be connected to, e.g., the analog front end circuit array 604 of FIG. 6. A photon impinging on the enabled SPAD 900 causes an avalanche current to flow between the voltage source $V_E$ and $-V_{BD}$. This induces a voltage change in $V_{OUT}$ at the node 902. This voltage change can be detected and amplified by the AF circuit array 604.

In FIG. 9, the select transistor 904 and the quenching transistor 908 are depicted as PMOS transistors and the gating transistor 906 is shown as an NMOS transistor. However, other embodiments may use alternate circuitry and circuit configurations. In other embodiments, the select transistor 904 and the quenching transistor 908 may be NMOS transistors and the gating transistor 906 a PMOS transistor. Alternatively, the select transistor 904, the gating transistor 906, and/or the quenching transistor 908 may be configured as different types of transistors or circuits.

The pixel shown in FIG. 9 also includes an optional fast recharge transistor 912 connected from the positive supply voltage $V_E$ and the output line of $V_{OUT}$. For the pixel shown, fast recharge transistor 912 is a PMOS transistor. The fast recharge transistor 912 is gated by a recharge signal $V_{RCH}$ 914. The recharge signal $V_{RCH}$ 914 can be synchronized with the gating signal $V_{GATE}$.

Figure 10:
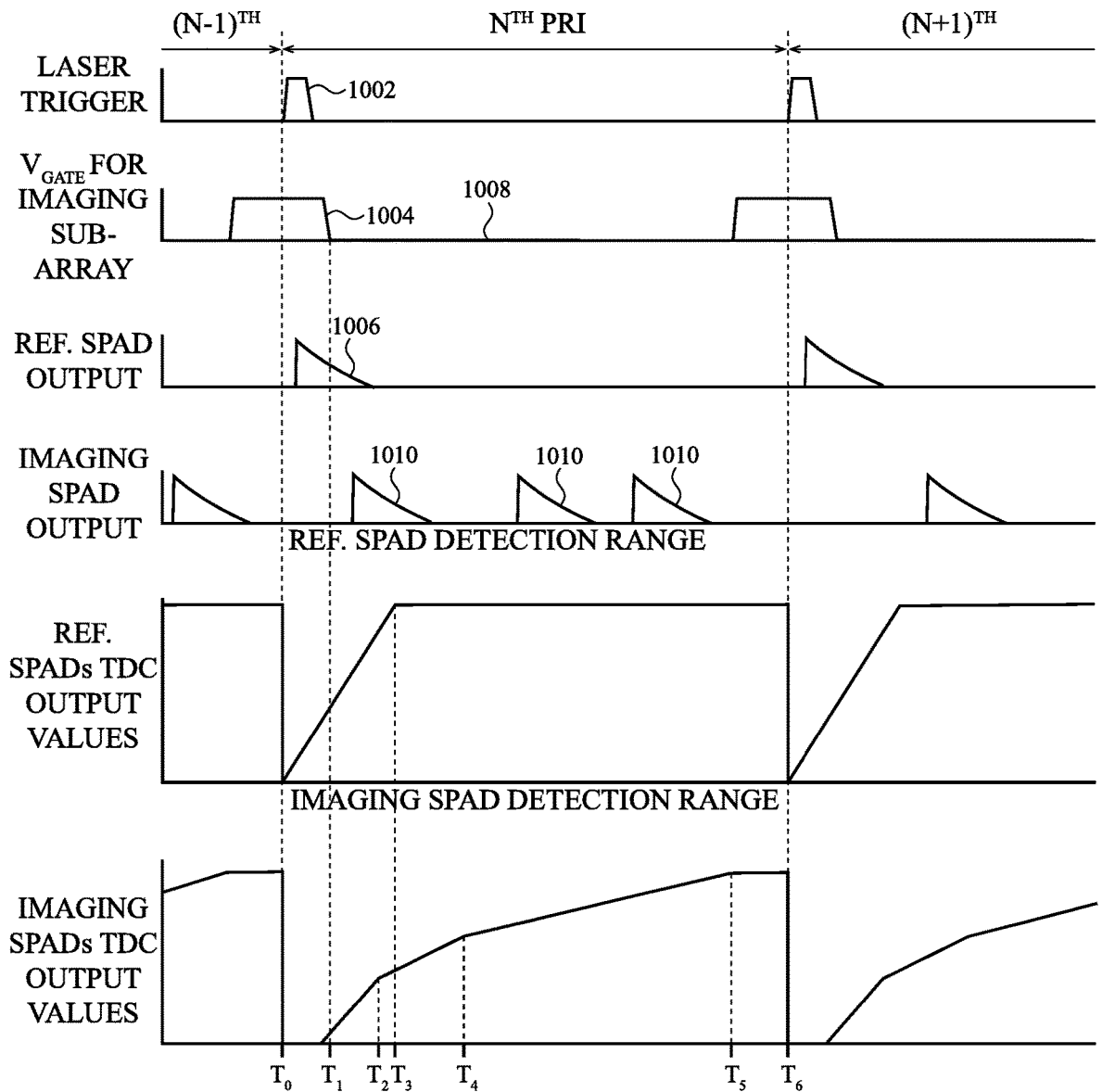
FIG. 10 shows an example timing diagram of the operation of a SPAD system during a pulse repetition interval.

FIG. 10 shows an example timing diagram of the operation of a SPAD system during each pulse repetition interval. The Nth PRI begins when the emitter emits a light pulse 1002 at time $T_0$. At time $T_0$, the gating signal ($V_{GATE}$) for the SPADs in the pixels in the imaging sub-array is at a first signal level 1004 that disables the SPADs in the pixels in the imaging sub-array. Between time $T_0$ and time $T_1$, the SPADs in the pixels in the imaging sub-array are disabled. One or more SPADs in the pixels in the reference sub-array may output a signal 1006 that indicates a photon is detected in light reflected from the cover layer. The first signal level 1004 may extend beyond the cover layer reflection time interval, and may include an additional time interval.

At time $T_1$, the signal level of the $V_{GATE}$ signals transitions to a second signal level 1008 that enables selected SPADs in the pixels in the imaging sub-array (or the SPADs in a section of the pixels in the imaging sub-array) to detect photons in the light reflected from the target and/or scene. Although the first signal level 1004 is depicted as a high signal level and the second signal level 1008 is shown as a low signal level, these signal levels are not required. In other embodiments, the first signal level 1004 may be a low signal level and the second signal level 1008 can be a high signal level.

Between time $T_1$ and time $T_5$, the enabled SPADs in the pixels in the imaging sub-array produce signals 1010 that represent detected photons. Time $T_5$ may be determined by a selected maximum detection range for objects in the FOV. That is, objects located far enough in the FOV that a reflected light pulse arrives after $T_5$ are not considered of interest. Further, the time $T_5$ may be chosen based on an assumption that photons arriving after $T_5$ are more likely to be from an ambient light source. At time $T_5$, the gating signal $V_{GATE}$ transitions to the first signal level 1004 to disable the SPADs in the imaging sub-array. The Nth PRI ends at time $T_6$.

The bottom two plots in FIG. 10 illustrate how the system correlates different times at which a SPAD is triggered (either a reference SPAD or an imaging SPAD), given by the TDC output values, with histogram bins. In both plots, the vertical axis can comprise a set of discrete levels corresponding to a bin of a histogram. The horizontal axis shows the $N^{th}$ PRI between the times $T_0$ and $T_6$ divided into subintervals. For a TDC output value (i.e., a digital value for the SPAD triggering time) within a particular subinterval, the corresponding bin number (or address) is given by the vertical coordinate of the corresponding point on graph. As described below with respect to FIGS. 11A-12, the bin numbers are spaced evenly on the vertical axes.

In the example embodiment, the graph for the reference SPADs rises linearly between time $T_0$ and time $T_3$ so that the TDC output values in this interval are separated into different bins of a histogram for the reference SPADs. For TDC output values between time $T_3$ and time $T_6$, the corresponding bin is either the last recorded bin, or is not entered into any bin of the histogram for the reference SPADs. In the illustrated embodiment, the reference SPADs are used for reference signals only so the TDC output values for the reference SPADs are not considered or analyzed after time $T_3$. Not considering the TDC output values for the reference SPADs after time $T_3$ is optional, and in other embodiments, the TDC output values for the reference SPADs may be considered and/or analyzed after time $T_3$.

Like the TDC output values for the SPADs in the pixels in the reference sub-array, the TDC output values for the SPADs in the pixels in the imaging sub-array represent the arrival times of the photons detected by the SPADs. The graph in the bottom plot shows how TDC output values from imaging SPADs that lie between time $T_1$ and time $T_5$ correlate with bin numbers for a non-uniform histogram. The plot does not have a single slope over that time period. The slope of the plot changes between time $T_1$ and time $T_5$. The inflection points are associated with the non-uniform histograms that are constructed during the Nth PRI.

The TDC output values from an imaging SPAD that are used to construct a non-uniform histogram can be obtained using several techniques. One technique can encode the TDC output values as the TDC output values are produced by the TDC array circuit. The required address length for the non-uniform histogram may be reduced by compressing or encoding the TDC output values.

FIG. 11A depicts two plots relating how TDC output values can be assigned to produce first a uniform histogram such as in FIG. 7, and to produce a non-uniform histogram, such as in FIG. 8. To produce the uniform histogram of TDC output values the vertical axis gives the Histogram Bin Number (or equivalently the bin address in memory) and consists of equally spaced bin numbers, from BIN 1 up to BIN N. As a result, for each bin the corresponding subinterval of time, such as subintervals $D_1$ to $D_2$ and $D_2$ to $D_3$, on the horizontal time axis have equal width. Plot 1100 depicts how the TDC output values output from the TDC array circuit are assigned to a corresponding bin number. For example, if the TDC output value of an avalanche event occurs at time 1103, the count in BIN 8 is incremented by one.

Plot 1101 illustrates a curve that can serve as a basis for a histogram used to record TDC output values. The slope of the plot 1101 changes over the PRI. In the illustrated embodiment, the plot 1101 is smooth over the entire range of TDC values (e.g., from $D_1$ to $D_{MAX}$). An encoder circuit (e.g., encoder 607) can be used to produce any arbitrary plot or curve. The particular TDC output values $D_1$ to $D_{MAX}$ that represent a start and end time can be shared among all of the TDC circuits and may be stored in memory circuits (e.g., SRAM) so as to be statically or dynamically reprogrammable.

Another technique may post-encode the TDC output values after the TDC output values are produced by the TDC array circuit. FIG. 11B depicts a second set of plots of linear TDC output values and post-encoded TDC output values. The plot 1100 described above is shown in part for comparison. The plot 1102 is a piece-wise linear approximation to the plot 1101 of FIG. 11A. For generating the non-uniform histogram, in this case the bin numbers on the vertical axis are depicted separated by a uniform step size, and range from BIN 1 to BIN M. As a result, the respective subintervals of time corresponding to each bin as marked on the horizontal time axis are not uniform in width. Plot 1102 illustrates the TDC output values that are used to construct a non-uniform histogram. The slope of the plot 1102 changes over the PRI. Like the embodiment shown in FIG. 11A, an encoder circuit (e.g., encoder 607) may be used to produce any arbitrary curve.

FIG. 12 shows an example method that can be used to post-encode the TDC output values to generate the non-uniform histogram and produce the representative plot shown in FIG. 11B. The method can be performed by the encoder 607 shown in FIG. 6. The illustrated process is performed on each TDC output value (d) produced by each TDC circuit in the TDC array circuit. Initially, a determination is made at block 1200 as to whether the TDC output value d is less than or equal to $D_1$, where D1 represents a start time for the time subinterval corresponding to the first bin address transition. If so, the bin address for that TDC output value is zero (block 1202). The zero bin address corresponds to subinterval or region 1104 in FIG. 11.

If the TDC output value d is greater than $D_1$, the method passes to block 1204 where a determination is made as to whether the TDC output value d is greater than $D_1$ and less than or equal to $D_2$, where $D_2$ represents a start time for a second bin address transition. If so, the bin address for that TDC output value is d-D1 (block 1206). This bin address corresponds to a subinterval of time within the region 1106 in FIG. 11, with all subintervals in region 1106 having equal width.

If the TDC output value d is greater than $D_2$, the method passes to block 1208 where a determination is made as to whether the TDC output value d is greater than $D_2$ and less than or equal to $D_3$, where $D_3$ represents a third bin address transition. If so, the bin address for that TDC output value is $(D_2-D_1)+(d-D_2)/2$ (block 1210). This bin address corresponds to region 1108 in FIG. 11. In the region 1108 the TDC values may be allocated among more than one bin, as shown, but the respective subintervals of time for those bins have equal width. However, the width of the subintervals of time between $D_2$ and $D_3$ are wider than the subintervals of time between $D_1$ and $D_2$. Thus the bins for the resulting histogram correspond to time subintervals having a non-uniform widths.

If the TDC output value d is greater than $D_3$, the method passes to block 1212 where a determination is made as to whether the TDC output value d is greater than $D_3$ and less than or equal to $D_{MAX}$, where $D_{MAX}$ represents a fourth bin address transition. If so, the bin address for that TDC output value is $(D_2-D_1)+(D_3-D_2)/2+(d-D_3)/3$ (block 1214). This bin address corresponds to region 1110 in FIG. 11.

If the TDC output value d is not greater than D3 and less than or equal to $D_{MAX}$, the method passes to block 1216 where a determination is made as to whether the TDC output value d is greater than $D_{MAX}$. If so, the bin address for that TDC output value is $D_{MAX}$ (block 1218). This bin address corresponds to region 1112 in FIG. 11. When the TDC output value d is not greater than DMAX, a bin address is not assigned to that TDC output value d (block 1220).

The method depicted in FIG. 12 uses natural numbers for the divisions in the bin address calculations. For example, the bin address calculation at block 1214 is d $(D_2-D_1)+(D_3-D_2)/2+(d-D_3)/3$. The subtraction $(D_3-D_2)$ is divided by 2 and the subtraction $(d-D_3)$ is divided by 3. In other embodiments, fractional numbers can be used in one or more bin address calculations.

Figure 13A:
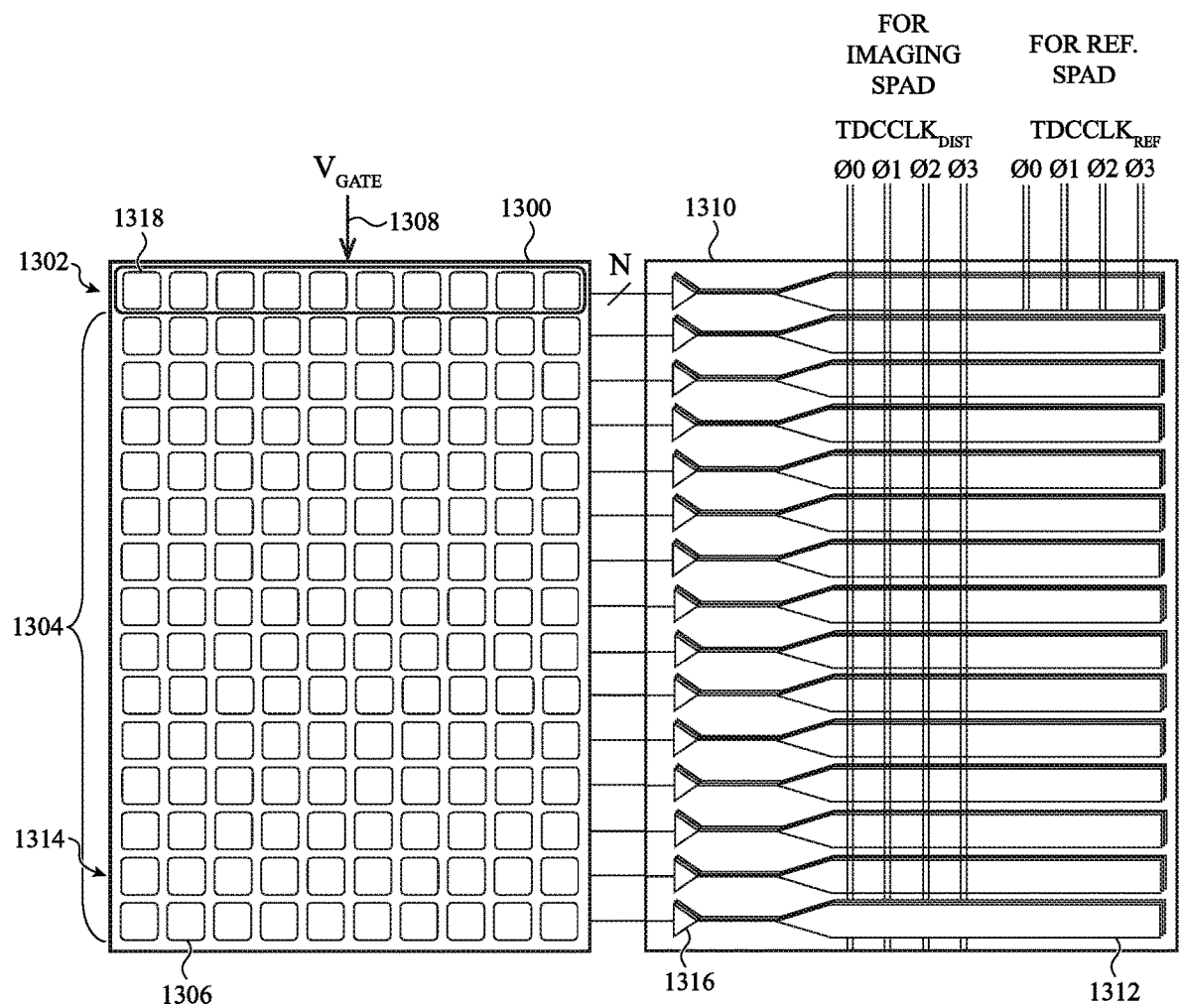
FIG. 13A shows an example TDC array circuit operably connected to a pixel array.

Another technique for obtaining non-uniform TDC output values that may be used to construct a non-uniform histogram involves using TDC clocking signals that have different phases. This technique is optional, and may be used either in conjunction with the methods disclosed above, or alone. FIG. 13A shows an example TDC array circuit operably connected to a pixel array. The pixel array 1300 includes a reference sub-array 1302 and an imaging sub-array 1304. Each pixel 1306 in the imaging sub-array 1304 can be configured as shown in FIG. 9. As such, one or more gating signals ($V_{GATE}$) for the pixels 1306 are received by the pixel array 1300 on line 1308. A processing device (e.g. processing device 108 in FIG. 1 or processing device 2204 in FIG. 22) can cause the one or more gating signals to be transmitted to the pixel array 1300 to enable the SPADs in select pixels 1306 in the imaging sub-array 1304.

As described earlier, the TDC array circuit 1310 includes N TDC circuits 1312 for each line of pixels (e.g., row 1314) in the pixel array 1300, where N represents the number of SPADs that are enabled at any given time. Thus, N TDC circuits 1312 are operably connected to each respective row 1314 in the pixel array 1300. In some embodiments, the TDC array circuit 1310 includes a buffer or amplifier 1316 connected between a respective TDC circuit 1312 in the TDC array circuit 1310 and the rows in the pixel array 1300 operably connected to the respective TDC circuit 1312. One example of an amplifier 1316 is a transimpedance amplifier.

In the illustrated embodiment, the TDC array circuit 1310 receives clock signals having different phases. In particular, four clock signals each having a different phase $\Phi_0, \Phi_1, \Phi_2, \Phi_3$ ($TDCCLK_{REF}$) are transmitted to the TDC circuits 1312 operably connected to the row(s) of pixels 1318 in the reference sub-array 1302. Similarly, four clock signals each having a different phase $\Phi_0, \Phi_1, \Phi_2, \Phi_3$ ($TDCCLK_{DIST}$) are transmitted to the TDC circuits 1312 operably connected to the row(s) of pixels 1306 in the imaging sub-array 1304. Although four different phases are shown and described, other embodiments are not limited to this implementation. Any number of phases can be used for the clock signals.

Figure 13B:
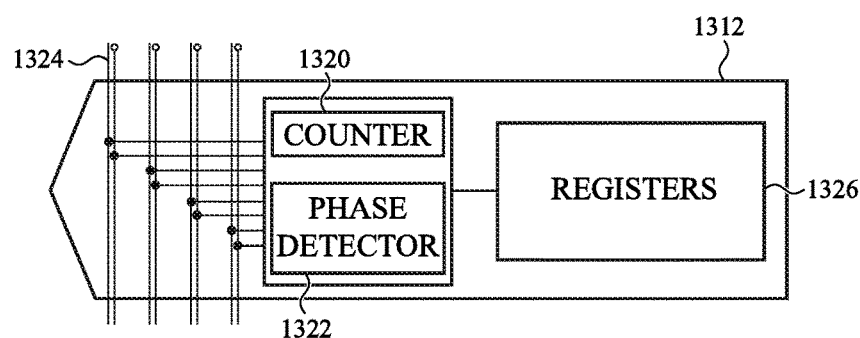
FIG. 13B shows a block diagram of a TDC circuit that is suitable for use in the TDC array circuit shown in FIG. 13A.

FIG. 13B shows a block diagram of a TDC circuit that is suitable for use in the TDC array circuit shown in FIG. 13A. Each TDC circuit 1312 includes a counter 1320 and a phase detector 1322 connected to each clock signal line 1324. The TOF is determined based on the number of clock cycles counted on a clock signal line 1324 associated with any of the phases and the state of the phases on all the clock signal lines 1324. One or more registers 1326 are connected to the counter 1320 and the phase detector 1322. The register(s) 1326 are used to store avalanche events and TDC values captured during a line scan period.

Figure 14:
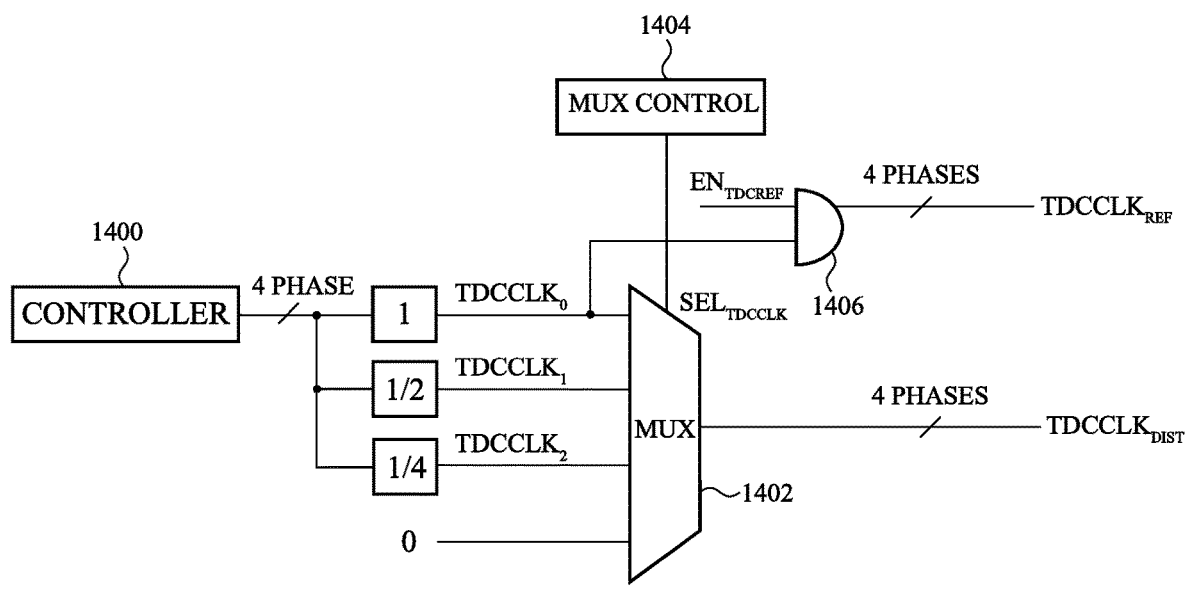
FIG. 14 shows a block diagram of a clocking circuit that is suitable for use with the TDC array circuit shown in FIG. 13A.

FIG. 14 shows a block diagram of a clocking circuit that is suitable for use with the TDC array circuit shown in FIG. 13A. A controller 1400 outputs three clocking signals having different phases. In the illustrated embodiment, $TDCCLK_0$ has a first phase, $TDCCLK_1$ has a second phase that is half the phase of $TDCCLK_0$ (e.g., two times slower), and $TDCCLK_2$ has a third phase that is one-fourth the phase of $TDCCLK_0$ (e.g., four times slower). The fourth clock signal has a value of zero. Different clock signals and phases can be used in other embodiments.

The clock signals zero, $TDCCLK_0$, $TDCCLK_1$, and $TDCCLK_2$ are input into a multiplexer 1402. A multiplexer controller 1404 transmits a select signal $SEL_{TDCCLK}$ to the multiplexer 1402 to select a clock signal to distribute to the pixels in the imaging sub-array of the pixel array. A gate 1406 (e.g., an AND gate) is used to prevent the four phases used by the reference TDC clock signal ($TDCCLK_{REF}$) from toggling when $TDCCLK_{REF}$ is not used, thus saving power (see e.g., $TDCCLK_{REF}$ waveform in FIG. 15). The signal $EN_{TDCREF}$ is an enable signal that is received by the gate 1406. Those skilled in the art will recognize that the signal $EN_{TDCREF}$ may change if a circuit or a gate different from an AND gate is used in the embodiment of FIG. 14.

The TDC output values are encoded when received in the embodiment shown in FIG. 14. Hence, the encoder 607 depicted in FIG. 6 can be omitted, which reduces the amount of die area needed for the SPAD detector. Additionally, the technique of FIG. 14 can save power because the slower clock signals consume less power compared to a fast clock signal.

Figure 15:
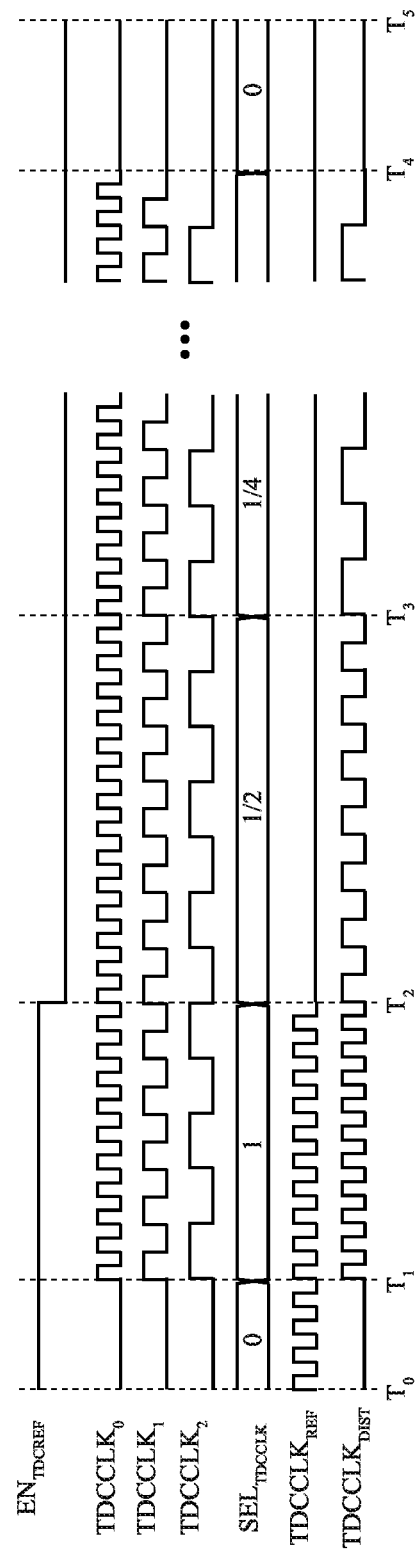
FIG. 15 shows an example timing diagram that can be used with the clocking circuit illustrated in FIG. 14.

FIG. 15 shows an example timing diagram that can be used with the clocking circuit illustrated in FIG. 14. The top four plots depict the clock signals $EN_{TDCREF}$, $TDCCLK_0$, $TDCCLK_1$, and $TDCCLK_2$. At time $T_0$, the SPADs in the pixels in the imaging sub-array are disabled so the select signal $SEL_{TDCCLK}$ selects the fourth clock signal having the value zero. The value zero corresponds to the far left bin 810 in the first set of bins 802 shown in FIG. 8. Additionally, the signal level of the $EN_{TDCREF}$ signal is at a high signal level.

At time $T_1$, the detection period for the pixel array begins and the select signal $SEL_{TDCCLK}$ selects the first clock signal $TDCCLK_0$. The first clock signal $TDCCLK_0$ corresponds to the second set of bins 804 depicted in FIG. 8. In other words, the SPADs have the finest resolution or sensitivity based on the first clock signal $TDCCLK_0$.

At time $T_2$, the select signal $SEL_{TDCCLK}$ selects the second clock signal $TDCCLK_1$ and the signal level of the $EN_{TDCREF}$ signal transitions to a low signal level. The second clock signal $TDCCLK_1$ corresponds to the third set of bins 806 depicted in FIG. 8. In other words, the SPADs have the fine resolution or sensitivity in response to the second clock signal $TDCCLK_1$. As described earlier, the fine resolution is less than the finest resolution and greater than the coarse resolution.

Finally, at time $T_3$, the select signal $SE_{LTDCCLK}$ selects the third clock signal $TDCCLK_2$. The third clock signal $TDCCLK_2$ corresponds to the fourth set of bins 808 depicted in FIG. 8. The SPADs have the course resolution or sensitivity in response to the third clock signal $TDCCLK_2$.

At time $T_4$, the maximum time of flight ends and the select signal $SEL_{TDCCLK}$ selects the fourth clock signal having the value zero. The value zero corresponds to the far right bin 810 in the first set of bins 802 shown in FIG. 8. The detection period ends at time $T_5$.

A non-uniform histogram is one technique for modulating the sensitivity of a SPAD detector. Varying the recharge time of one or more SPADs is another technique that can be used to modulate the sensitivity of a SPAD detector. A modulated or variable sensitivity may be used to reduce sampling biases discussed previously.

Figure 16:
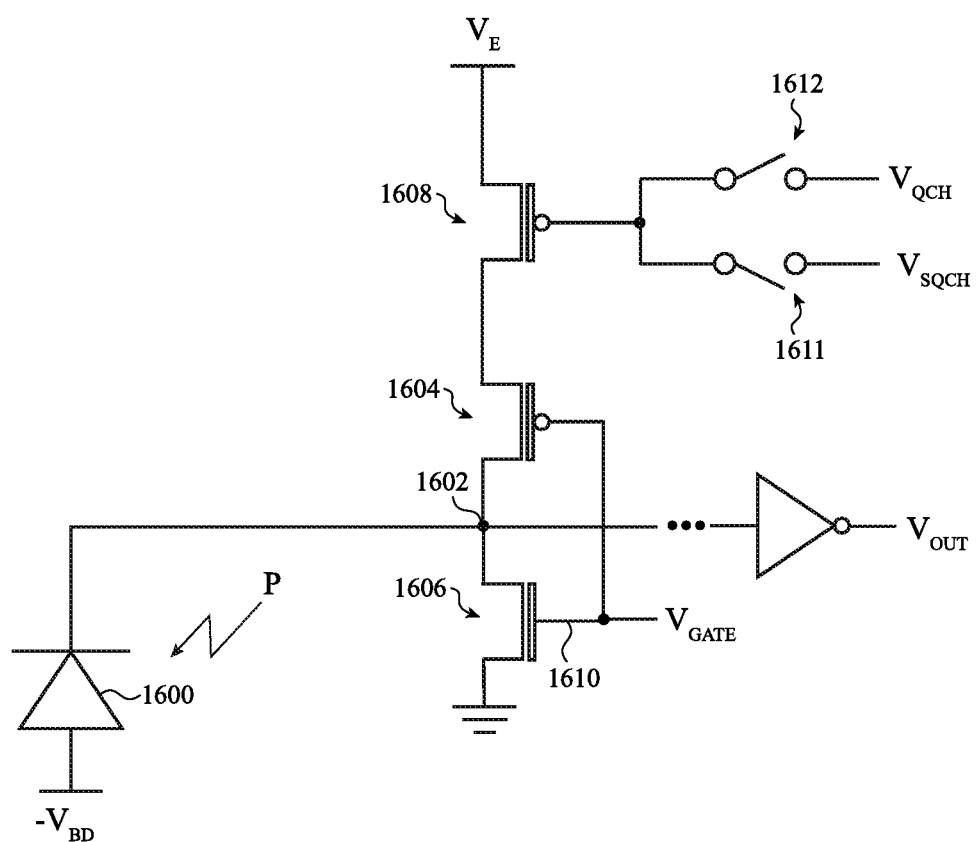
FIG. 16 shows a schematic diagram of another example pixel in a SPAD detector.

FIG. 16 shows a schematic diagram of another example pixel in a SPAD detector. A SPAD 1600 is connected between a voltage source $-V_{BD}$ and a node 1602. Like the embodiment of FIG. 9, the SPAD 1600 is depicted with the anode connected to the voltage source $-V_{BD}$ and the cathode connected to the node 1602, but other embodiments are not limited to this configuration. The terminals of the SPAD 1600 can be swapped in other embodiments, i.e., changing the types (polarity) of the transistors of the pixel.

A first terminal of a select transistor 1604 and a first terminal of a gating transistor 1606 are also connected to the node 1602. A second terminal of the gating transistor 1606 is connected to a reference voltage (e.g., a ground). A second terminal of the select transistor 1604 is connected to a first terminal of a quenching transistor 1608, and the second terminal of the quenching transistor 1608 is connected to a voltage source $V_E$. The gates of the select transistor 1604 and the gating transistor 1606 are connected to a common input line 1610. A gating signal $V_{GATE}$ applied to the common input line 1610 is used to select and enable the operations of the SPAD 1600 and to deselect and disable the operations of the SPAD 1600. When the SPAD is enabled, avalanche events are detected on output line $V_{OUT}$.

The quenching transistor 1608 controls the recharge time of the SPAD 1600. The gate of the quenching transistor 1608 can be connected to a first quenching signal $V_{SQCH}$ through switch 1611 and to a second quenching signal $V_{QCH}$ through switch 1612. Thus, the quenching transistor bias is switchable between two different signal levels. One quenching signal, such as the first quenching signal $V_{SQCH}$, produces a sensitivity-controlled period during the PRI.

When the sensitivity-controlled period is to be used, the switch 1611 is closed and the switch 1612 is opened. The sensitivity-controlled period can be used earlier in the PRI to reduce the sensitivity of the SPAD 1600 to photons reflected from objects that are close to the SPAD detector and/or objects that have a higher reflectivity. For example, the sensitivity-controlled period may be used for a given period of time after the gating signal $V_{GATE}$ enables the operations of the SPAD 1600. In other embodiments, multiple sensitivity-controlled periods can be used during one or more PRI.

At the end of the sensitivity-controlled period, the switch 1611 is opened and the switch 1612 is closed. The other quenching signal, such as the second quenching signal $V_{QCH}$, is used to maintain the SPAD 1600 at a given sensitivity level (e.g., a maximum sensitivity), while providing the largest recharge current through the quenching transistor 1608 so as to reach the nominal recharge time (e.g., shortest dead time). The constant sensitivity period can be used to maintain (e.g., maximize) the sensitivity of the SPAD 1600 to photons reflected from objects that are farther from the SPAD detector and/or objects that have a lower reflectivity.

In some implementations, the sensitivity-controlled period is adjustable and can be set dynamically based on the TOFs of previously received photons (e.g., photons received during earlier PRIs). Additionally or alternatively, the signal level of $V_{SQCH}$ can be adjusted dynamically between PRIs or based on one or more characteristics in the scene in the FOV of the SPAD detector. For example, the lighting conditions of the scene and/or previous determined TOFs can be considered when adjusting the signal level of $V_{SQCH}$. In other embodiments, the sensitivity-controlled period is the same as the nominal recharge time (i.e., shortest dead time) so the gate of the quenching transistor 1608 does not switch between two voltage levels. In those embodiments, the need for the first quenching signal $V_{SQCH}$ is obviated so the gate of quenching transistor 1608 remains connected to the same voltage level $V_{QCH}$.

Figure 17:
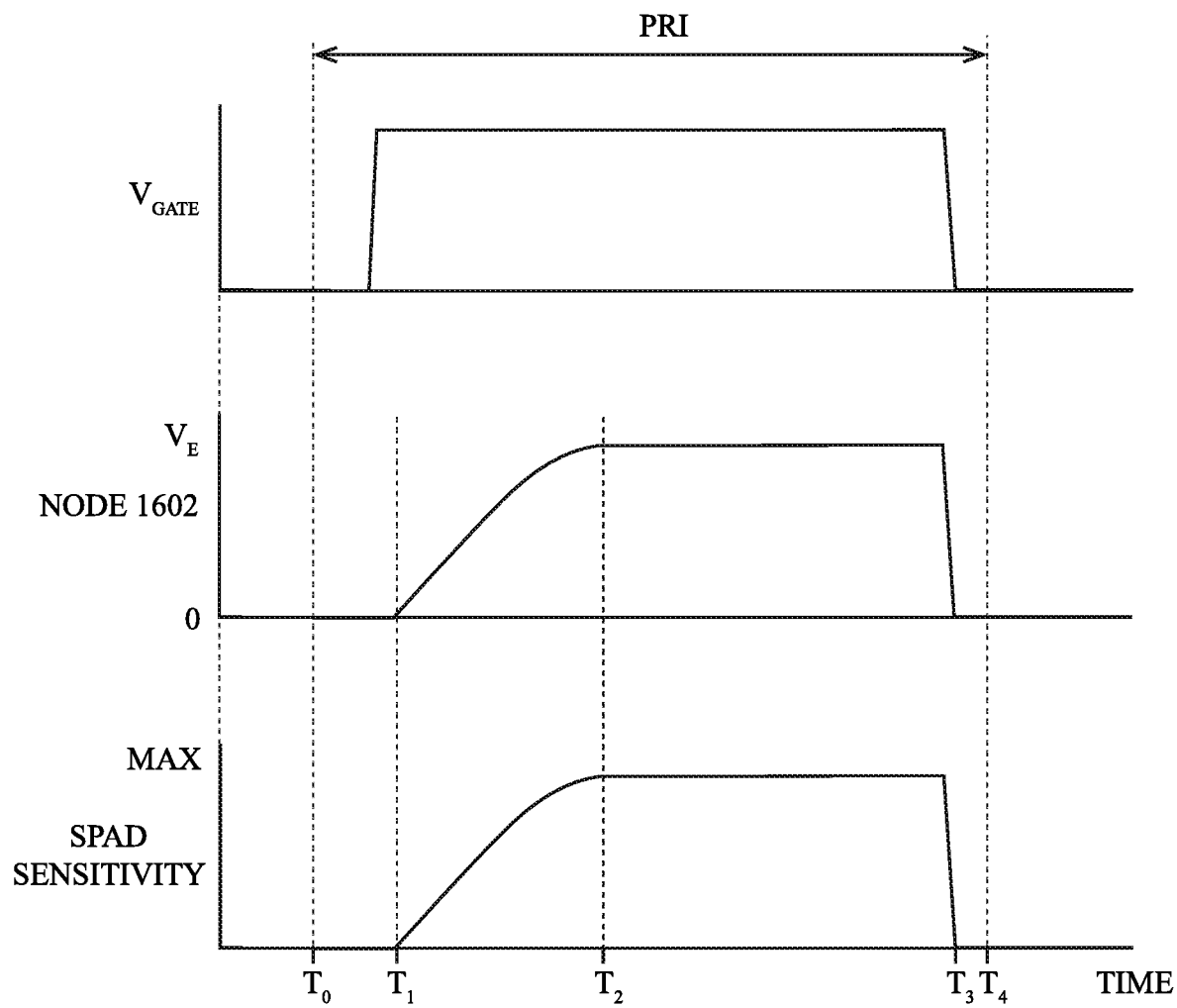
FIG. 17 shows one example of the operation of the switchable gate bias of the quenching transistor.

FIG. 17 shows one example of the operation of the switchable gate bias of the quenching transistor. The emitter produces a light pulse at time $T_0$. Between time $T_0$ and time $T_1$, the gating signal $V_{GATE}$ is at a signal level that disables the operations of the SPAD. Accordingly, the signal level on the node 1602 is at zero and the SPAD sensitivity is at zero.

At time $T_1$, the gating signal $V_{GATE}$ transitions to a signal level that enables the operations of the SPAD. At substantially the same time, the switch 1611 is closed and the switch 1612 is opened to connect the gate of the quenching transistor to $V_{SQCH}$. The signal level on the node 1602 and the SPAD sensitivity rises between the time $T_1$ and the time $T_2$. Thus, the time period between time $T_1$ and time $T_2$ is referred to as the sensitivity-controlled period.

At time $T_2$, the switch 1611 is opened and the switch 1612 is closed to connect the gate of the quenching transistor to $V_{QCH}$. The signal level on the node 1602 is maintained at $V_E$ and the SPAD sensitivity is maintained at a given level (e.g., a maximum sensitivity). At time $T_3$, the gating signal $V_{GATE}$ transitions to a signal level that disables the operations of the SPAD, and the PRI ends at time $T_4$.

Although two gate bias signals are shown in FIG. 16, other embodiments are not limited to this configuration. In some implementations, the gate bias of the quenching transistor can be switched between three or more gate bias signals to define a given SPAD sensitivity.

Varying the recharge time of one or more SPADs is a second technique that can be used to modulate the sensitivity of a SPAD detector. Varying the voltage supply connected to the quenching transistor is a third method that may be used to modulate the sensitivity of a SPAD.

Figure 18:
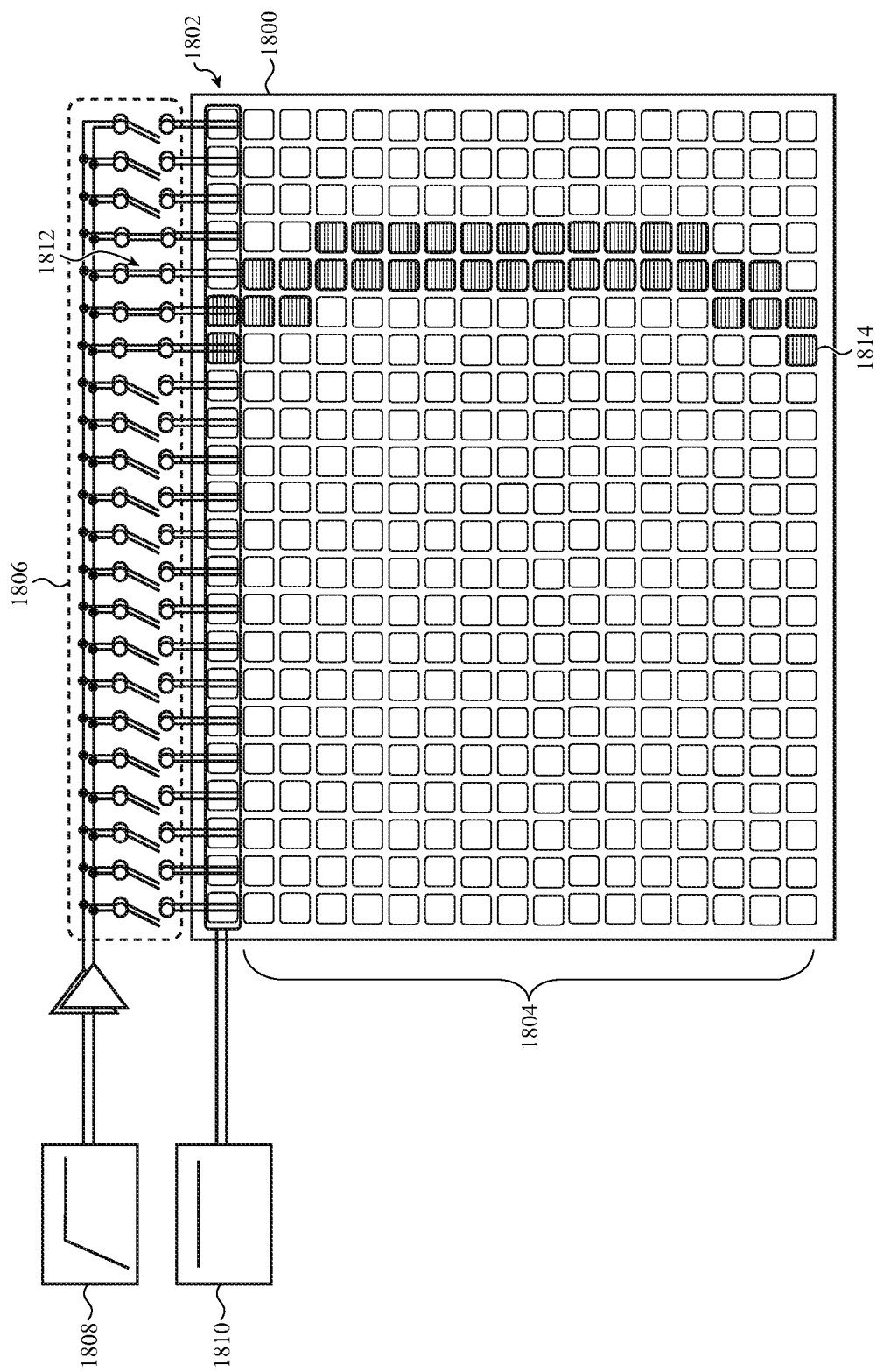
FIG. 18 shows a block diagram of a pixel array having a sensitivity that can be modulated.

FIG. 18 depicts a block diagram of a pixel array having a sensitivity that can be modulated. The sensitivity of one or more SPADs is modulated through a variable $V_E$ signal that is connected to a terminal of the quenching transistor. The pixel array 1800 includes a reference sub-array 1802 and an imaging sub-array 1804. A switch array 1806 is connected to each line of pixels (e.g., columns of pixels) in the imaging sub-array 1804 to selectively connect one or more lines of pixels to a variable $V_E$ signal 1808. The variable $V_E$ signal 1808 can have any given waveform. The SPADs in the reference sub-array 1802 may be connected to a constant $V_E$ signal 1810.

In one embodiment, the variable $V_E$ signal 1808 is transmitted to a select line or lines of pixels (e.g., column(s) of pixels) to reduce power consumption. For example, in the illustrated embodiment, a set of switches 1812 is closed while the other switches are open to only transmit the variable $V_E$ signal 1808 to the enabled SPADs in pixels 1814 (enabled SPADs represented by hatching). Although four lines (e.g., columns) of pixels have SPADs that are enabled in FIG. 18, other embodiments can enable one or more lines of pixels.

The variable $V_E$ signal 1808 may be generated in any suitable manner. For example, a digital-to-analog converter can be used to produce the variable $V_E$ signal 1808. Alternatively, a single-slope voltage ramp generator may be used to generate the variable $V_E$ signal 1808.

Figure 19:
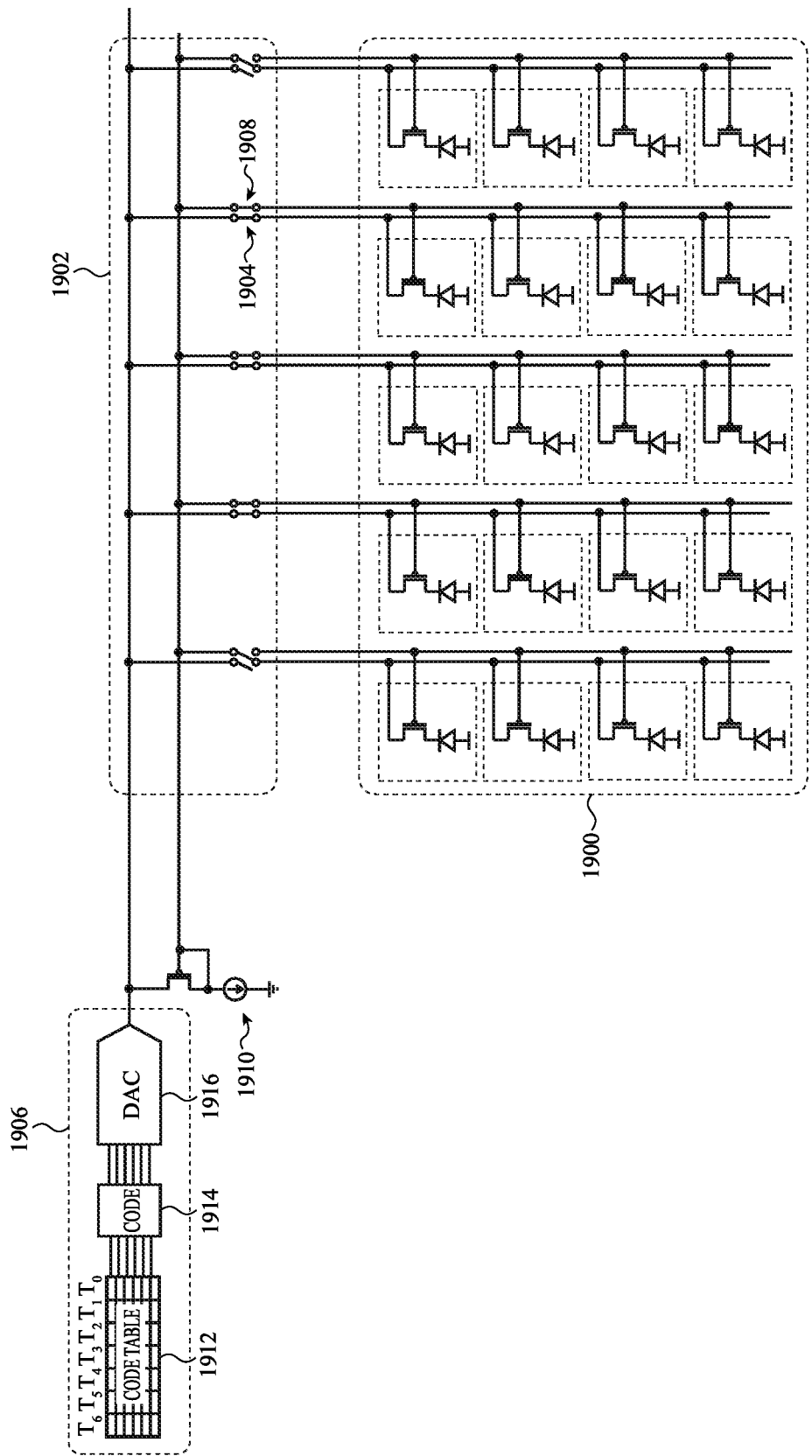
FIG. 19 shows a block diagram of a first pixel array that is suitable for use as the pixel array shown in FIG. 18.

FIG. 19 shows a block diagram of a first pixel array that is suitable for use as the pixel array shown in FIG. 18. In the illustrated embodiment, the sensitivity of one or more SPADs is modulated through a variable $V_E$ signal and a global current source. The pixel array 1900 is connected to switch array 1902. Each switch in the switch array 1902 is connected to a respective line of pixels (e.g., columns) to selectively connect one or more lines of pixels to a variable $V_E$ signal generator 1906 and to a global current source 1910. For example, the switch 1904 is closed to connect a terminal of the quenching transistor to the variable $V_E$ signal generator 1906. The switch 1908 is closed to connect the gate of the quenching transistor to the global current source 1910.

The variable $V_E$ signal generator 1906 includes a code table 1912, a code selector 1914, and a digital-to-analog converter (DAC) 1916. When a $V_E$ signal having a particular shape is to be produced over a given period of time, an input code stored in the code table 1912 is used to repeatedly trigger the DAC 1916 during the given period of time.

Figure 20:
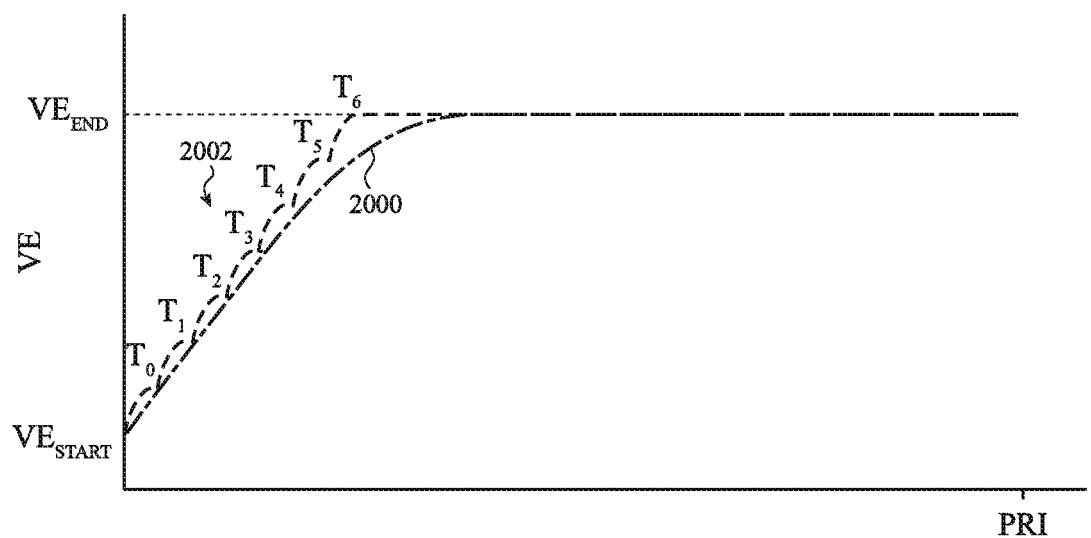
FIG. 20 shows an example $V_E$ signal that can be produced by the $V_E$ signal generator shown in FIG. 19.

FIG. 20 shows example signals that can be produced by the $V_E$ signal generator and the global current source shown in FIG. 19. Plot 2000 represents the signal produced by the global current source 1910. Plot 2002 illustrates an example output signal produced by the DAC 1916. The plot 2002 can be generated by repeatedly sending each code to the DAC 1916 for a given period of time.

Figure 21:
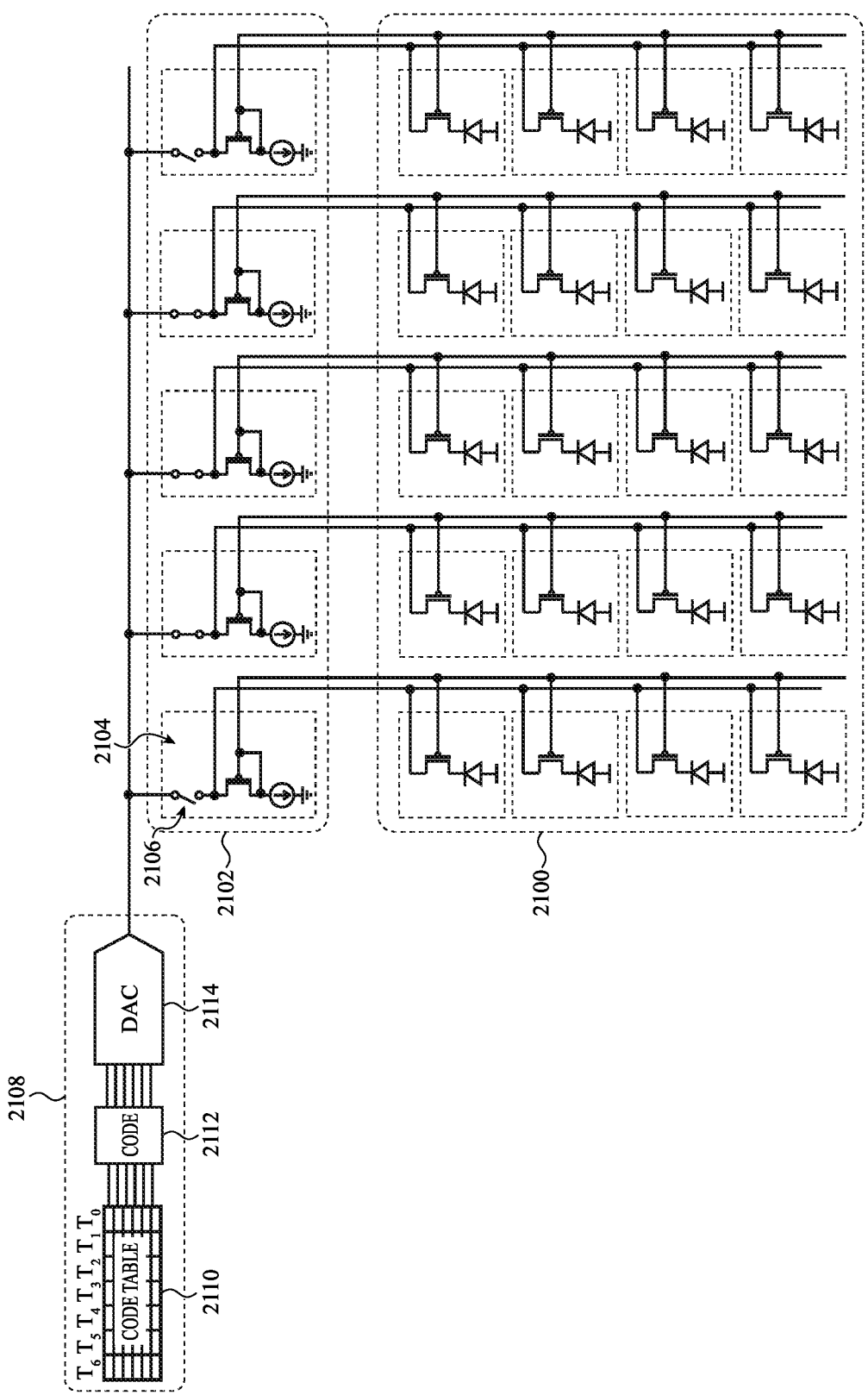
FIG. 21 shows a block diagram of a second pixel array that is suitable for use as the pixel array shown in FIG. 18.

FIG. 21 shows a block diagram of a second pixel array that is suitable for use as the pixel array shown in FIG. 18. As described earlier, the sensitivity of one or more SPADs is modulated through a variable $V_E$ signal and local current sources. The pixel array 2100 is connected to an array 2102 of switches 2106 and current sources 2104. Each switch 2106 and current source 2104 is connected to a respective line of pixels (e.g., columns). Each switch 2106 selectively connects one or more lines of pixels to the variable $V_E$ signal generator 2108.

The variable $V_E$ signal generator 2108 is similar to the variable $V_E$ signal generator 1906 in FIG. 19. The variable $V_E$ signal generator 2108 includes a code table 2110, a code selector 2112, and a digital-to-analog converter 2114. When a $V_E$ signal having a particular waveform is to be produced over a given period of time, an input code stored in the code table 2110 is used to repeatedly trigger the DAC 2114 during the given period of time.

Figure 22:
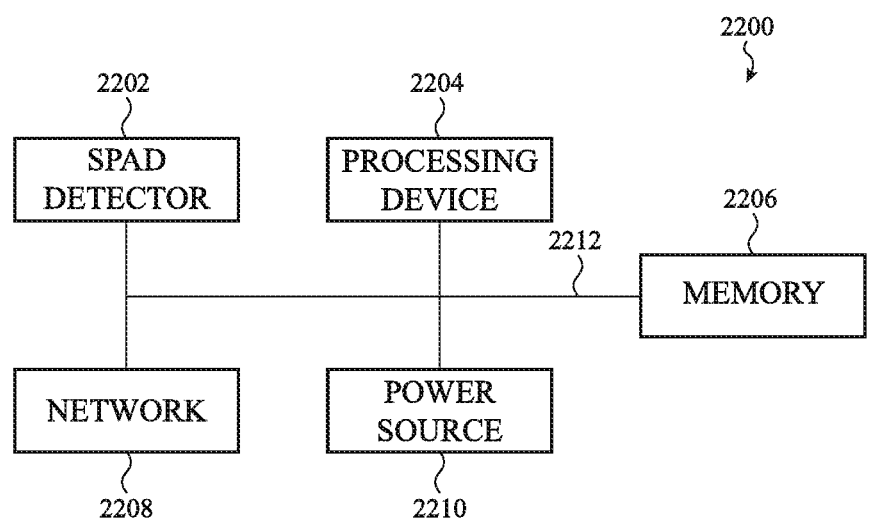
FIG. 22 shows a block diagram of an electronic device that includes one or more SPAD detectors.

FIG. 22 shows a block diagram of an electronic device that can include one or more SPAD detectors. The electronic device 2200 includes one or more SPAD detectors 2202, one or more processing devices 2204, memory 2206, one or more network interfaces 2208, and a power source 2210, each of which will be discussed in turn below.

The one or more processing devices 2204 can control some or all of the operations of the electronic device 2200. The processing device(s) 2204 can communicate, either directly or indirectly, with substantially all of the components of the electronic device 2200. For example, one or more system buses 2212 or other communication mechanisms can provide communication between the SPAD detector(s) 2202, the processing device(s) 2204, the memory 2206, the network interface 2208, and/or the power source 2210. In some embodiments, the processing device(s) 2204 can be configured to receive output signals from the SPAD detectors 2202 and process the output signals to determine one or more characteristics associated with the reflected light, the target (e.g., target 106 in FIG. 1), and/or the scene.

The processing device(s) 2204 can be implemented as any electronic device capable of processing, receiving, or transmitting data or instructions. For example, the one or more processing devices 2204 can be a microprocessor, a central processing unit (CPU), an application-specific integrated circuit (ASIC), a digital signal processor (DSP), or combinations of multiple such devices. As described herein, the term "processor" is meant to encompass a single processor or processing unit, multiple processors, multiple processing units, or other suitably configured computing element or elements.

The memory 2206 can store electronic data that can be used by the electronic device 2200. For example, the memory 2206 can store electrical data or content such as, for example, audio files, document files, timing and control signals, and so on. The memory 2206 can be configured as any type of memory. By way of example only, memory 2206 can be implemented as random access memory, read-only memory, Flash memory, removable memory, or other types of storage elements, in any combination.

The network interface 2208 can receive data from a user or one or more other electronic devices. Additionally, the network interface 2208 can facilitate transmission of data to a user or to other electronic devices. The network interface 2208 can receive data from a network or send and transmit electronic signals via a wireless or wired connection. For example, the photon counts that are determined by the processing device(s) 2204 can be transmitted to another electronic device using the network interface 2208.

Examples of wireless and wired connections include, but are not limited to, cellular, Wi-Fi, Bluetooth, and Ethernet. In one or more embodiments, the network interface 2208 supports multiple network or communication mechanisms. For example, the network interface 2208 can pair with another device over a Bluetooth network to transfer signals to the other device while simultaneously receiving signals from a Wi-Fi or other wired or wireless connection.

The one or more power sources 2210 can be implemented with any device capable of providing energy to the electronic device 2200. For example, the power source 2210 can be a battery. Additionally or alternatively, the power source 2210 can be a wall outlet that the electronic device 2200 connects to with a power cord. Additionally or alternatively, the power source 2210 can be another electronic device that the electronic device 2200 connects to via a wireless or wired connection (e.g., a connection cable), such as a Universal Serial Bus (USB) cable.

In some embodiments, the SPAD detector 2202 is configured as a back-illuminated SPAD detector. In such embodiments, the pixel array is positioned adjacent to a light-receiving surface of the SPAD detector and the circuitry (e.g., gating transistor, quenching transistor, etc.) connected to the SPADs in the pixel array are positioned below the pixel array. Other embodiments can configure the SPAD detector 2202 differently.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A single-photon avalanche diode (SPAD) detector, comprising:
    a pixel array comprising multiple lines of pixels, each pixel comprising a SPAD;
    a time-to-digital converter (TDC) array circuit operably connected to the pixel array, the TDC array circuit comprising an array of TDC circuits with a subset of the TDC circuits operably connected to each respective line of pixels; and a memory operably connected to the TDC array circuit, the memory configured to store a non-uniform histogram that comprises:

a first bin having a first width, the first bin representing a first count of photons having times of flight within a first range of times of flight; and a second bin having a second width different from the first width, the second bin representing a second count of photons having times of flight within a second range of times of flight different from the first range of times of flight, wherein the first bin provides the SPAD detector with a first sensitivity to photons and the second bin provides the SPAD detector with a second sensitivity to photons that is different from the first sensitivity.

2. The SPAD detector of claim 1, further comprising a controller operably connected to the TDC array circuit, the controller configured to generate clock signals for the TDC array circuit.

3. The SPAD detector of claim 1, wherein:
the SPAD detector is included in a line scan system;
the multiple lines of pixels in the pixel array are arranged in rows and columns;
the pixels in the pixel array are scanned in sections, each section including a subset of the columns in the pixel array; and
a number of TDC circuits in each subset of the TDC circuits correspond to a subset of scanned pixels in each row in each section.

4. The SPAD detector of claim 3, wherein:
the pixel array comprises:
a reference sub-array comprising reference pixels; and
an imaging sub-array comprising imaging pixels; and
the SPAD detector further comprises a controller operably connected to the TDC array circuit, the controller configured to:
produce a first set of clock signals comprising a first clock signal having a first phase and a second clock signal having a different second phase; and
produce a second set of clock signals comprising a third clock signal having a third phase and a fourth clock signal having a different fourth phase;
the first set of clock signals is received by the TDC circuits connected to the reference pixels; and
the second set of clock signals is received by the TDC circuits connected to the imaging pixels.

5. The SPAD detector of claim 3, wherein the memory is configured to store multiple non-uniform histograms and each non-uniform histogram is associated with each scanned pixel in each row of each section.

6. The SPAD detector of claim 1, wherein the pixel array comprises:
a reference sub-array comprising one or more reference pixels; and
an imaging sub-array comprising one or more imaging pixels.

7. The SPAD detector of claim 6, wherein each imaging pixel in the imaging sub-array comprises:
a SPAD operably connected between a node and a first voltage supply;
a gating transistor operably connected between the node and a reference voltage supply; and
a quenching transistor operably connected between the node and a second voltage supply, wherein the gating transistor is configured to enable an operation of the SPAD or disable the operation of the SPAD.

8. The SPAD detector of claim 6, wherein each TDC circuit operably connected to each imaging pixel outputs multiple TDC output values for the imaging pixel and the multiple TDC output values increase non-uniformly over a detection period of the imaging pixel.

9. The SPAD detector of claim 6, further comprising an encoder circuit operably connected between the TDC array circuit and the memory, wherein:
each TDC circuit operably connected to a respective imaging pixel outputs multiple TDC output values for the imaging pixel and the multiple TDC output values increase linearly over a detection period of the imaging pixel; and
the encoder circuit is configured to encode the multiple TDC output values such that the multiple encoded TDC output values increase non-uniformly over the detection period of the imaging pixel.

10. The SPAD detector of claim 6, wherein the reference sub-array is positioned adjacent to an edge of the imaging sub-array.

11. The SPAD detector of claim 1, wherein the non-uniform histogram further comprises:
a third bin having a third width different from the first width and the second width, the third bin representing a third count of photons having times of flight within a third range of times of flight different from both the first range of times of flight and the second range of times of flight, the third bin providing the SPAD detector with a third sensitivity to photons that is different from each of the first sensitivity and the second sensitivity.

12. A pixel in a single-photon avalanche diode (SPAD) detector, the pixel comprising:
a SPAD operably connected between a node and a first voltage supply;
a gating transistor operably connected between the node and a reference voltage supply; and
a quenching transistor operably connected between the node and a second voltage supply, wherein
the gating transistor is configured to receive a gating signal that enables an operation of the SPAD at a first time and subsequently disables the operation of the SPAD at a second time;
a gate of the quenching transistor is connected to a first switch and a second switch;
the first switch is connected to a first quenching signal; and
the second switch is connected to a second quenching signal that is different from the first quenching signal.

13. The pixel of claim 12, wherein a time interval between the first time and the second time determines a detection period for the SPAD during which the SPAD detects photons.

14. The pixel of claim 12, wherein:
the first quenching signal produces a sensitivity-controlled period in the SPAD, the SPAD having a variable sensitivity during the sensitivity-controlled period; and
the second quenching signal produces a constant sensitivity period in the SPAD.

15. The pixel of claim 12, further comprising a select transistor operably connected between the quenching transistor and the gating transistor, wherein a gate of the select transistor and a gate of the gating transistor are connected to a common input line.

16. A single-photon avalanche diode (SPAD) detector, comprising:

a pixel array comprising a plurality of pixels arranged in a reference sub-array and an imaging sub-array, each pixel comprising a SPAD and a quenching transistor operably connected to the SPAD;

a constant voltage source operably connected to a terminal of each quenching transistor in the reference sub-array;

a switch array operably connected to the pixel array, wherein each switch in the switch array is connected to a respective line of pixels in the imaging sub-array; and a variable signal source operably connected to a terminal of each quenching transistor in the pixels in each line of pixels in the imaging sub-array through a respective switch in the switch array.

17. The SPAD detector of claim 16, wherein the variable signal source comprises a digital-to-analog converter operably connected to a variable voltage input signal.

18. The SPAD detector of claim 16, wherein the variable signal source comprises a single-slope voltage ramp generator.

19. A single-photon avalanche diode (SPAD) detector, comprising:

a pixel array comprising a plurality of pixels, each pixel comprising a SPAD and a quenching transistor operably connected to the SPAD;

a switch array operably connected to the pixel array;

a current source operably connected to a gate of each quenching transistor in each line of pixels in the pixel array through a respective first switch in the switch array; and a variable signal generator operably connected to a terminal of each quenching transistor in each line of pixels in the pixel array through a respective second switch in the switch array.

20. The SPAD detector of claim 19, wherein the current source is a global current source.

21. A method for operating a single-photon avalanche diode (SPAD) detector, the SPAD detector comprising a pixel array that includes a reference sub-array of reference pixels and an imaging sub-array of imaging pixels, the method comprising:

detecting a start time to enable an operation of an imaging SPAD in an imaging pixel in the imaging sub-array using a reference SPAD in a reference pixel in the reference sub-array;

in response to detecting the start time, enabling the operation of the imaging SPAD such that the imaging SPAD is operable to detect photons;

determining, for each detected photon, a respective time of flight; and constructing a non-uniform histogram based on a time of flight of each detected photon, wherein the non-uniform histogram comprises:

a first bin having a first width, the first bin representing a first count of photons having times of flight within a first range of times of flight; and a second bin having a second width different from the first width, the second bin representing a second count of photons having times of flight within a second range of times of flight different from the first range of times of flight, the first bin providing the SPAD detector with a first sensitivity to photons and the second bin providing a second sensitivity to photons that is different from the first sensitivity.

22. The method of claim 21, further comprising disabling the operation of the imaging SPAD after construction of the non-uniform histogram.

23. The method of claim 21, wherein:

the first sensitivity is greater than the second sensitivity;

a first time of flight of a detected first photon that reflects off a first target that is closer to the SPAD detector increments the first count in the first bin; and a second time of flight of a detected second photon that reflects off a second target that is farther from the SPAD detector increments the second count in the second bin.

* * * * *